(12) United States Patent
Nocon et al.

(10) Patent No.: US 11,385,635 B2
(45) Date of Patent: Jul. 12, 2022

(54) AUTONOMOUS DRONE PLAY AND DIRECTIONAL ALIGNMENT

(71) Applicant: Disney Enterprises, Inc., Burbank, CA (US)

(72) Inventors: Nathan D. Nocon, Valencia, CA (US); Timothy M. Panec, Studio City, CA (US); Tritia V. Medrano, Rowland Heights, CA (US); Clifford Wong, Burbank, CA (US); Nicholas F. Barone, Glendale, CA (US); Elliott H. Baumbach, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 370 days.

(21) Appl. No.: 16/406,654

(22) Filed: May 8, 2019

(65) Prior Publication Data

US 2020/0004235 A1    Jan. 2, 2020

Related U.S. Application Data

(60) Provisional application No. 62/693,298, filed on Jul. 2, 2018.

(51) Int. Cl.
| | |
|---|---|
| *G05D 1/00* | (2006.01) |
| *G05D 1/10* | (2006.01) |
| *G05D 3/10* | (2006.01) |
| *G05B 13/02* | (2006.01) |
| *A63H 27/00* | (2006.01) |
| *G05D 1/02* | (2020.01) |

(52) U.S. Cl.
CPC ....... *G05D 1/0016* (2013.01); *G05B 13/0265* (2013.01); *G05D 1/0011* (2013.01); *G05D 1/0027* (2013.01); *A63H 27/00* (2013.01); *G05D 1/0291* (2013.01); *G05D 1/101* (2013.01)

(58) Field of Classification Search
CPC .. G05D 1/0016; G05D 1/0027; G05D 1/0291; G05D 1/101; G05D 1/0011; G05D 1/0033; G05B 13/0265; A63H 27/00
See application file for complete search history.

(56) References Cited

U.S. PATENT DOCUMENTS

| | | | |
|---|---|---|---|
| 9,442,496 B1* | 9/2016 | Beckman | G10K 11/17821 |
| 10,032,111 B1* | 7/2018 | Bertram | G09B 9/052 |
| 2015/0324706 A1* | 11/2015 | Warren | G05B 15/02 |
| | | | 700/275 |
| 2018/0089563 A1* | 3/2018 | Redding | G05D 1/0088 |
| 2019/0004518 A1* | 1/2019 | Zhou | G06N 3/04 |
| 2019/0056718 A1* | 2/2019 | Satou | G06N 3/08 |

* cited by examiner

*Primary Examiner* — Anshul Sood
(74) *Attorney, Agent, or Firm* — Patterson + Sheridan, LLP

(57) ABSTRACT

Embodiments provide for autonomous drone play and directional alignment by in response to receiving a command for a remotely controlled device to perform a behavior, monitoring a first series of actions performed by the remotely controlled device that comprise the behavior; receiving feedback related to how the remotely controlled device performs the behavior, wherein the feedback is received from at least one of a user, a second device, and environmental sensors; updating, according to the feedback, a machine learning model used by the remotely controlled device to produce a second, different series of actions to perform the behavior; and in response to receiving a subsequent command to perform the behavior, instructing the remotely controlled device to perform the second series of actions.

19 Claims, 22 Drawing Sheets

| Time | t0 | t1 | t2 | t3 | t4 | t5 | t6 | t7 | t8 | t9 | t10 | t11 | t12 | t13 | t14 | t15 | t16 | t17 | t18 |
|---|---|---|---|---|---|---|---|---|---|---|---|---|---|---|---|---|---|---|---|
| Command | Juke | | Right | | Right | | Right | | Down | | Down | | Down | | Pivot Left | | Accelerate | | End |
| Action | Learn Begin | | Move Right | Pause | Move Right | Pause | Move Right | Pause | Move Down | Pause | Move Down | Pause | Move Down | Pause | Yaw Left | Pause | Move Forward | Move Forward | Learn End |
| Location | 0,0,0 | 0,0,0 | 0,1,0 | 0,1,0 | 0,2,0 | 0,2,0 | 0,3,0 | 0,3,0 | 0,3,-1 | 0,3,-1 | 0,3,-1 | 0,3,-2 | 0,3,-2 | 0,3,-3 | 0,3,-3 | 0,3,-3 | 0,2,-3 | 0,0,-3 | 0,0,-3 |
| Orientation | 0,0,0 | 0,0,0 | 0,0,0 | 0,0,0 | 0,0,0 | 0,0,0 | 0,0,0 | 0,0,0 | 0,0,0 | 0,0,0 | 0,0,0 | 0,0,0 | 0,0,0 | 0,0,0 | -90,0,0 | -90,0,0 | -90,0,0 | -90,0,0 | -90,0,0 |
| Time | t0 | t1 | t2 | t3 | t4 | t5 | t6 | t7 | t8 | t9 | t10 | t11 | t12 | t13 | t14 | t15 | t16 | t17 | t18 |

FIG. 6A

| Time | t0 | t1 | t2 | t3 | t4 | t5 | t6 | t7 | t8 | t9 | t10 | t11 | t12 | t13 | t14 | t15 | t16 | t17 | t18 |
|---|---|---|---|---|---|---|---|---|---|---|---|---|---|---|---|---|---|---|---|
| Command | Juke | | Wider | | | | Spin | | | | | | | | Stop Spin | | | | |
| Action | Learn Begin | | | Move Right | Move Right | Pause | Move Right and Spin | Pause | Move Down and Spin | Pause | Move Down and Spin | Pause | Move Down and Spin | Pause | Yaw Left | Pause | Move Forward | Move Forward | End Behavior |
| Location | 0,0,0 | 0,0,0 | 0,2,0 | 0,2,0 | 0,4,0 | 0,4,0 | 0,6,0 | 0,6,0 | 0,6,-10 | 0,6,-10 | 0,6,-20 | 0,6,-20 | 0,6,-30 | 0,6,-30 | 0,6,-30 | 0,6,-30 | 0,5,-30 | 0,3,-30 | 0,3,-30 |
| Orientation | 0,0,0 | 0,0,0 | 0,0,0 | 0,0,0 | 0,0,0 | 0,0,0 | 90,0,0 | 90,0,0 | 180,0,0 | 180,0,0 | 270,0,0 | 270,0,0 | 0,0,0 | 0,0,0 | -90,0,0 | -90,0,0 | -90,0,0 | -90,0,0 | -90,0,0 |
| Time | t0 | t1 | t2 | t3 | t4 | t5 | t6 | t7 | t8 | t9 | t10 | t11 | t12 | t13 | t14 | t15 | t16 | t17 | t18 |

| Time | t0 | t1 | t2 | t3 | t4 | t5 | t6 | t7 | t8 | t9 | t10 | t11 | t12 | t13 | t14 | t15 | t16 | t17 | t18 |
|---|---|---|---|---|---|---|---|---|---|---|---|---|---|---|---|---|---|---|---|
| Command | Juke | Still | Wider | | | | | | | | | | | | | | | | |
| Action | Learn Begin | Move Right | Move Right and Spin | Move Right and Spin | Move Down and Spin | Move Down and Spin | Move Down and Spin | Yaw Left | Move Forward | End Behavior | | | | | | | | | |
| Location | 0,0,0 | 0,3,0 | 0,6,0 | 0,9,0 | 0,9,-1 | 0,9,-2 | 0,9,-3 | 0,9,-3 | 0,8,-3 | 0,6,-3 | | | | | | | | | |
| Orientation | 0,0,0 | 0,0,0 | 0,0,0 | 90,0,0 | 180,0,0 | 270,0,0 | 0,0,0 | -90,0,0 | -90,0,0 | -90,0,0 | | | | | | | | | |
| Time | t0 | t1 | t2 | t3 | t4 | t5 | t6 | t7 | t8 | t9 | t10 | t11 | t12 | t13 | t14 | t15 | t16 | t17 | t18 |

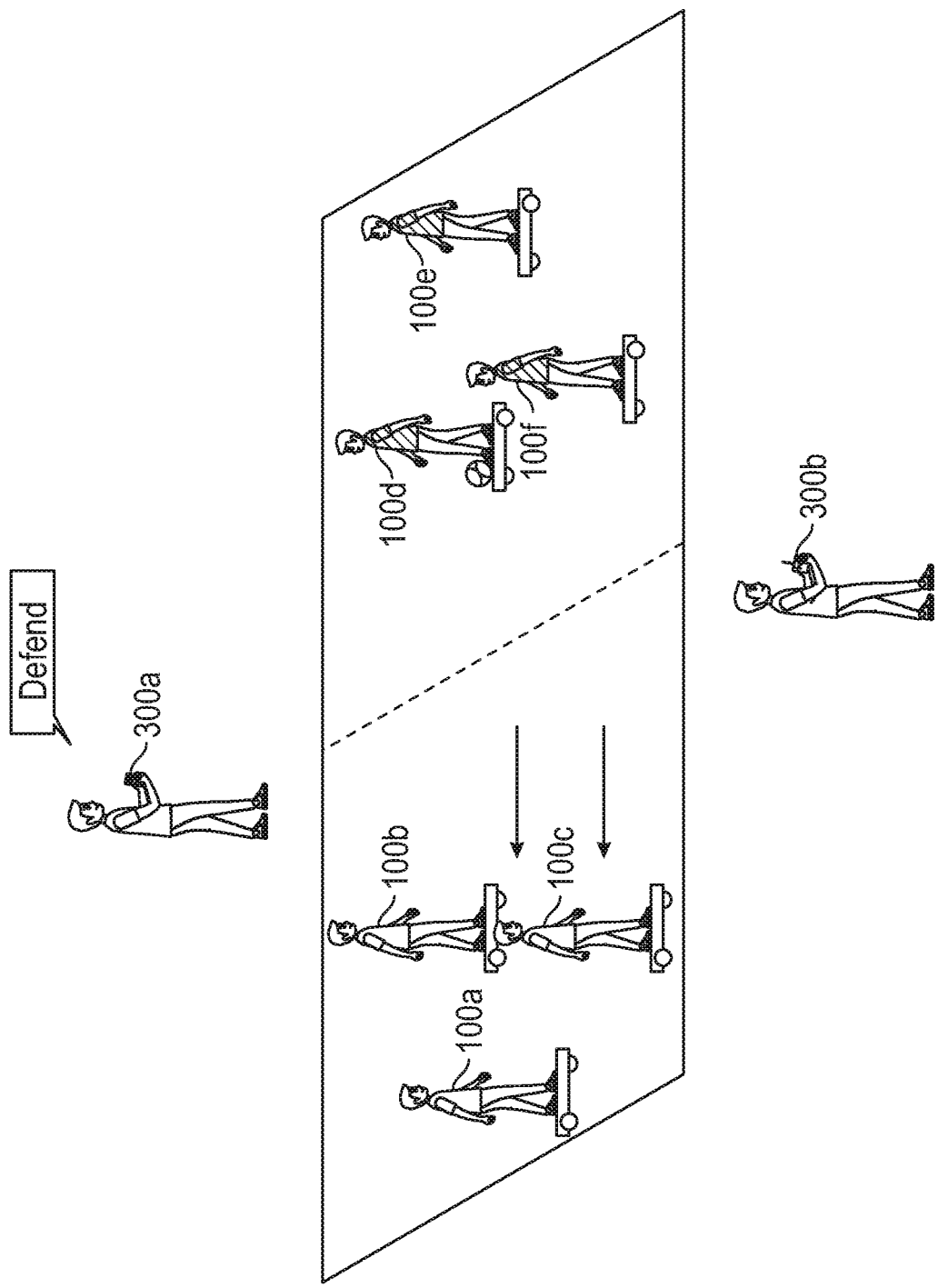

AUTONOMOUS DRONE PLAY AND DIRECTIONAL ALIGNMENT

CROSS-REFERENCE TO RELATED APPLICATIONS

This application claims benefit of U.S. provisional patent application Ser. No. 62/693,298 filed on Jul. 2, 2018, which is herein incorporated by reference in its entirety.

BACKGROUND

The remote manipulation and control of devices via voice commands relies on the device being able to properly identify the command from the utterance and to perform the command within desired conditions. Devices, however, can be slower and less precise when responding to voice commands than compared to manual commands input via a controller (e.g., keys, joysticks, mice).

SUMMARY

The adjustable control for autonomous devices via voice commands is provided herein. One or more remotely controlled devices may receive commands included in an utterance from a user in addition to or instead of manual commands (e.g., via a joystick, button, or mouse). A voice command may specify an action or a behavior that the autonomous device is to perform. For example, an action command may specify to one or more devices to "move forward three feet," and the device(s) will attempt to move forward three feet. A behavior command, however, may specify a series of action commands or variations of action commands. For example, a behavior command may specify "return to base," and the device will attempt to move to the location designated as the "base," either via the most direct route or a different route, depending on the behavior preference for completing the command. In another example, a behavior command may specify "evade player two," and a first device will attempt to stay away from a second device (designated as player two), and the distance and maneuvers that the first device employs to stay away from the second device will depend on the behavior preference for completing the command.

Examples of which may include systems and methods and computer readable storage media for organizing remotely controlled devices to perform and improve on behavior commands provided by voice, comprising at least one of: Receiving an utterance; Interpreting the utterance according to a model associated with vocal patterns for a given user; Determining a behavior command mapped to the utterance; Observing an environment, including objects in the environment; Determining a position (location and orientation) for a remotely controlled device in the environment; Determining, based on a machine learning model, a target position (location and orientation) in the environment for the remotely controlled device to perform the behavior command; Moving the remotely controlled device to the target position in the environment; Receiving feedback regarding movement to the target position; updating a machine learning model based on the feedback to adjust a manner in which the remotely controlled device moves in response to the behavior command or a manner in which a target location is determined; wherein the remotely controlled device acts autonomously absent user control; wherein the feedback is received in real-time to adjust performance of the behavior command; wherein the feedback is received after the behavior command has completed to adjust performance of the behavior command in the future; wherein the feedback is teaching the remotely controlled device to perform a series of actions; wherein the feedback is received from one of: the given user, another remotely controlled device, the environment, a scenario including the other remotely controlled device; wherein the feedback is individualized to a particular bot in a swarm of bots; wherein the feedback is group feedback for each bot in a swarm of bots; wherein the remotely controlled device is autonomous and the behavior command indicates a preference for commands for the remotely controlled device to select to autonomously perform; wherein the feedback adjusts a likelihood of the remotely controlled device selecting the commands performed in response to the behavior command in the future; wherein the behavior command indicates a series of directed actions for the remotely controlled device to select to autonomously perform; wherein the feedback adjusts the series of directed actions for when the remotely controlled device performs the behavior command in the future; and wherein the remotely controlled device transmits video to the user as part of an augmented reality experience.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 6A-C illustrate timing and positional diagrams for a series of actions being taught to a drone to perform in response to a behavioral voice command according to aspects of the present disclosure.

FIGS. 8A-E illustrate a series of actions for a group of robotic action figures responding to a behavioral voice command according to aspects of the present disclosure.

DETAILED DESCRIPTION

Figure 1B:
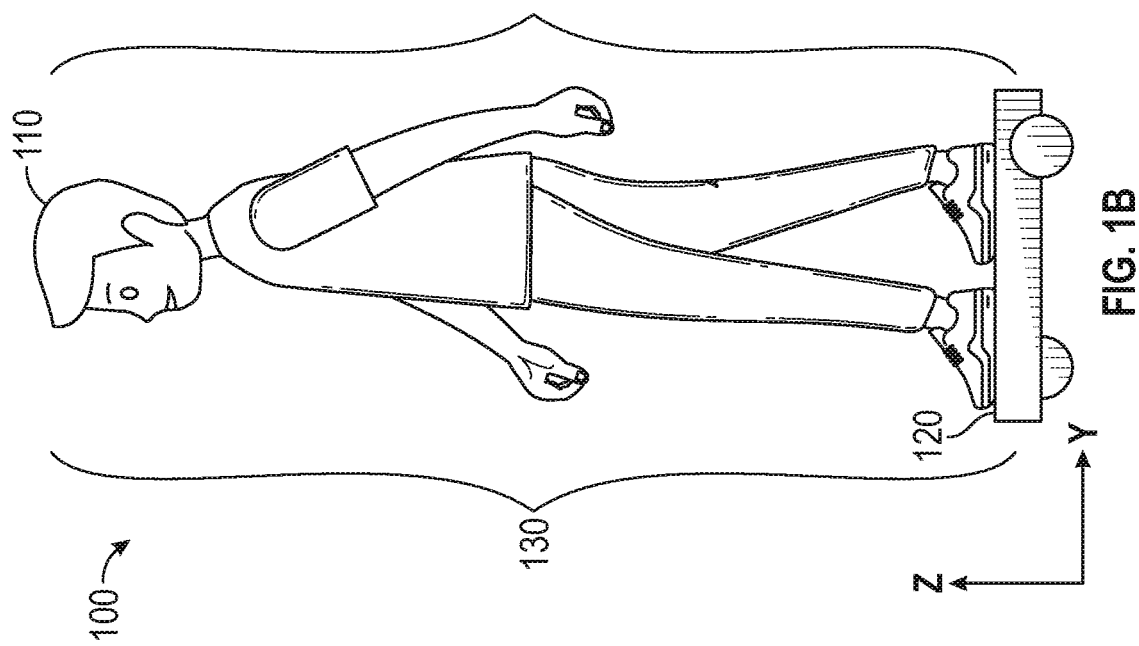
FIGS. 1A-C illustrate examples of remotely controlled devices according to aspects of the present disclosure.

The adjustable control for autonomous devices via voice commands is provided herein. One or more remotely controlled devices may receive commands included in an utterance from a user in addition to or instead of manual commands (e.g., via a joystick, button, or mouse). A voice command may specify an action or a behavior that the autonomous device is to perform. For example, an action command may specify "move forward three feet", and the device will attempt to move forward three feet. A behavior command, however, may specify a series of action commands or variations of action commands. For example, a behavior command may specify "return to base," and the device will attempt to move to the location designated as the "base," either via the most direct route or a different route, depending on the behavior preference for completing the command. In another example, a behavior command may specify "evade player two," and a first device will attempt to stay away from a second device (designated as player two), and the distance and maneuvers that the first device employs to stay away from the second device will depend on the behavior preference for completing the command.

The device learns the behavior preferences for completing the behavior commands via a machine learning model. The machine learning model receives feedback from one or more of a user, the environment, other devices in the environment, and the scenario to improve how the device selects and/or performs the individual action commands comprising the behavior command. For example, a device performing a "return to base" behavioral command that includes one or more "move to location" action commands may receive feedback from the user of "faster!" or "go around!" to modify the speeds at which or locations to which the device moves. In another example, a device performing an "evade" behavioral command may receive feedback from the user of "do a barrel roll" to include an action command set to perform a barrel roll maneuver as part of the "evade" command, feedback from the environment that the device is approaching an obstacle (e.g., a wall), feedback from a second device being evaded whether the device has successfully evaded the second device, etc. The machine learning model may develop a "world state" reflecting the environment and the scenario that may be unknown to or partially shared with the user.

The feedback allows the device to adjust current behaviors, and the machine learning model enables the device to build on the feedback in subsequent requests for the behavior command. For example, after receiving feedback to include a barrel roll as part of an "evade" behavioral command, the device may include more barrel rolls than before receiving the feedback.

In addition, the machine learning model may be used to account for a particular user's vocal patterns and for user-specified behavior commands. For example, a device may learn the voice frequency, accent, pronunciation idiosyncrasies, etc. of an associated user so that two or more users may issue voice commands in the environment, but only commands issued by the associated user will be acted upon. In another example, a user may manually, or via a series of action commands, specify a behavior that is to be associated with a new behavioral command when the user utters a specified utterance (e.g., "attack pattern delta!"). The machine learning model allows for personalization of the system for a given user. For example, two users may both teach associated remotely controlled devices a command associated with the same utterance, but those commands may perform different actions.

Behavior commands also allow a user to control a swarm of several devices via a single command. Unlike an action command, such as "move forward 3 feet" or "adjust throttle to 50%", the autonomous devices in the swarm may determine whether/how to implement the desired behavior based on the current status and/or location of the device and other features in the environment. For example, instead of having a user (or group of users) individually control an entire team of devices engaged in a game, a user may specify for the team to "tackle the ball carrier," and each device will (autonomously from the other devices) move towards the designated ball carrier and perform a "tackle" command if and when in range of the designated ball carrier.

When a behavior command is issued to a group of devices, the individual devices may be provided individualized feedback and/or group feedback from the user, the environment, other devices in the environment, or the scenario. For example, if a first device performs a requested "tackle" command, and a second device does not perform the requested "tackle" command, the first device may receive individualized positive feedback from the scenario (or the 'tackled' device) for the series of actions taken to perform the tackle command, while the second device receives no feedback or individualized negative feedback for not 'tackling' the ball carrier. Continuing the above example, the second device may receive individualized feedback from the user via an utterance to "show more hustle device 2," which the second device may interpret to use a higher speed the next time a "tackle the ball carrier" command is received. The devices of the second team (to which the ball carrier belongs) may receive negative group feedback from the scenario (or another device) for losing the ball in response to the ball carrier being tackled.

Figure 1A:
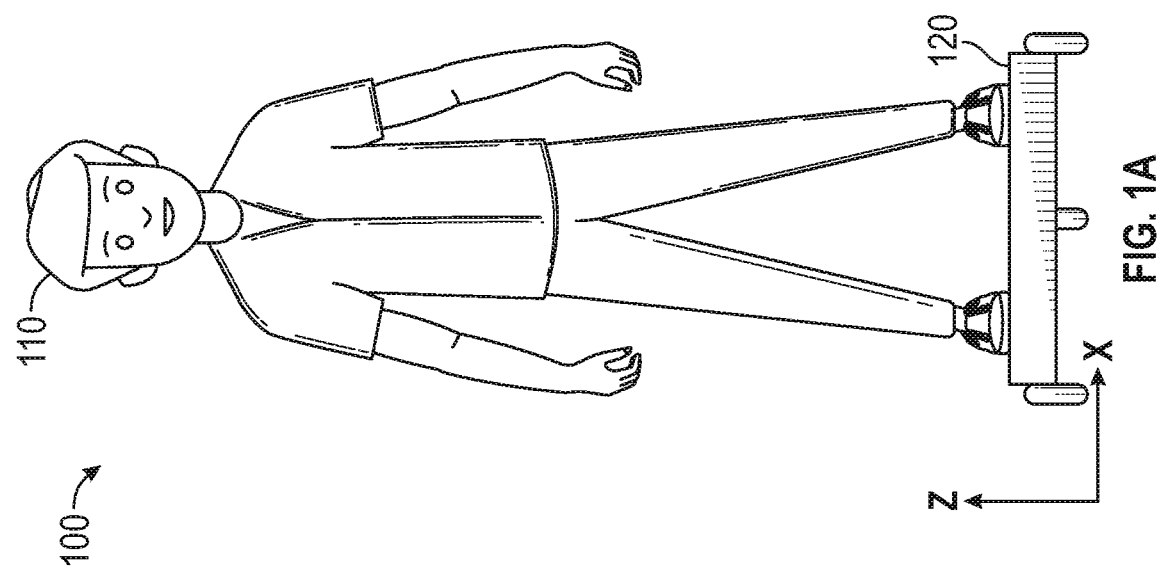

Referring now to FIGS. 1A and 1B, two views of an example remotely controlled device of a robotic action figure are shown. A robotic action figure may generally or collectively be referred to herein as a bot 100, bots 100, or bots 100*n*. Specific examples of a bot 100 may be distinguished from one another by various titles and postscripts after the associated element number (e.g., first bot 100*a*, second bot 100*b*).

Each bot 100 described herein includes a top 110, a base 120, a front 130, and a back 140. These descriptors of the bot 100 are defined in reference to the given bot 100 being described, and may vary from bot 100 to bot 100. For example, a user may hold a given bot 100 upside-down, with the base 120 above the top 110 without altering which portion of the bot 100 is considered the top 110 or the base 120. In another example, a bot 100 may have a top 110 defined at a position other than illustrated highest position (in the Z axis) shown in FIGS. 1A and 1B, such as when the arms of the bot 100 are raised above the head (corresponding to the designated top 110).

The base 120 provides the bot 100 with locomotive force, such as through one or more drive wheels capable of imparting locomotion to the bot 100, with the remaining wheels being free wheels. Although the example bot 100 shown in FIGS. 1A and 1B is mounted on a base 120 with three wheels, in other embodiments, a base 120 may use more or fewer than three wheels and in different arrangements than illustrated. In some embodiments, the base 120 may include rolling surfaces other than wheels (e.g., balls, skids, tracks) and may incorporate casters or rack/pinion interfaces to steer the movement of the bot 100. In various embodiments, the base 120 may omit wheels entirely, such as when the bot 100 uses two sets of tracks, a serpentine crawl for locomotion, uses legs for locomotion, is configured for use in water (and uses a propeller, jet, sails, or swimming motion for locomotion), is configured for use in flight (and uses a lifting gas or lifting surface and propellers or jets for locomotion), etc.

The front 130 and the back 140 designate opposite sides of the bot 100. In some embodiments the front 130 may occupy more or less than 180 degrees of the perimeter of the bot 100 (and the back 140, correspondingly, may occupy less or more than 180 degrees), and the front 130 and the back 140 may be sub-divided into various regions (e.g., front-left, front-center, front-right) around the perimeter of the bot 100. In some embodiments, the front 130 and the back 140 of the bot 100 may be defined relative to the head of the bot 100. In various embodiments, the bot 100 is defined to have a face (e.g., with eyes, nose, mouth, etc.) to represent a well-known character, animal, or archetype from a movie, television show, play, story, or real-life. Although the illustrated bot 100 is humanoid in appearance, other body forms are contemplated (robots, horses, elephants, dragons, cars, aircraft, ships, spaceships, etc.), which may have faces or other features that define a front 130 for the bot 100. For example, the bow of a ship may define the front 130 for a bot 100 designed to resemble that ship, while the face of a cartoon character may define the front 130 for an associated bot 100. In embodiments in which the head may swivel independently of the rest of the bot 100 (e.g., on a neck), another feature may be designated to define which side of the bot 100 is the front 130.

Figure 1C:
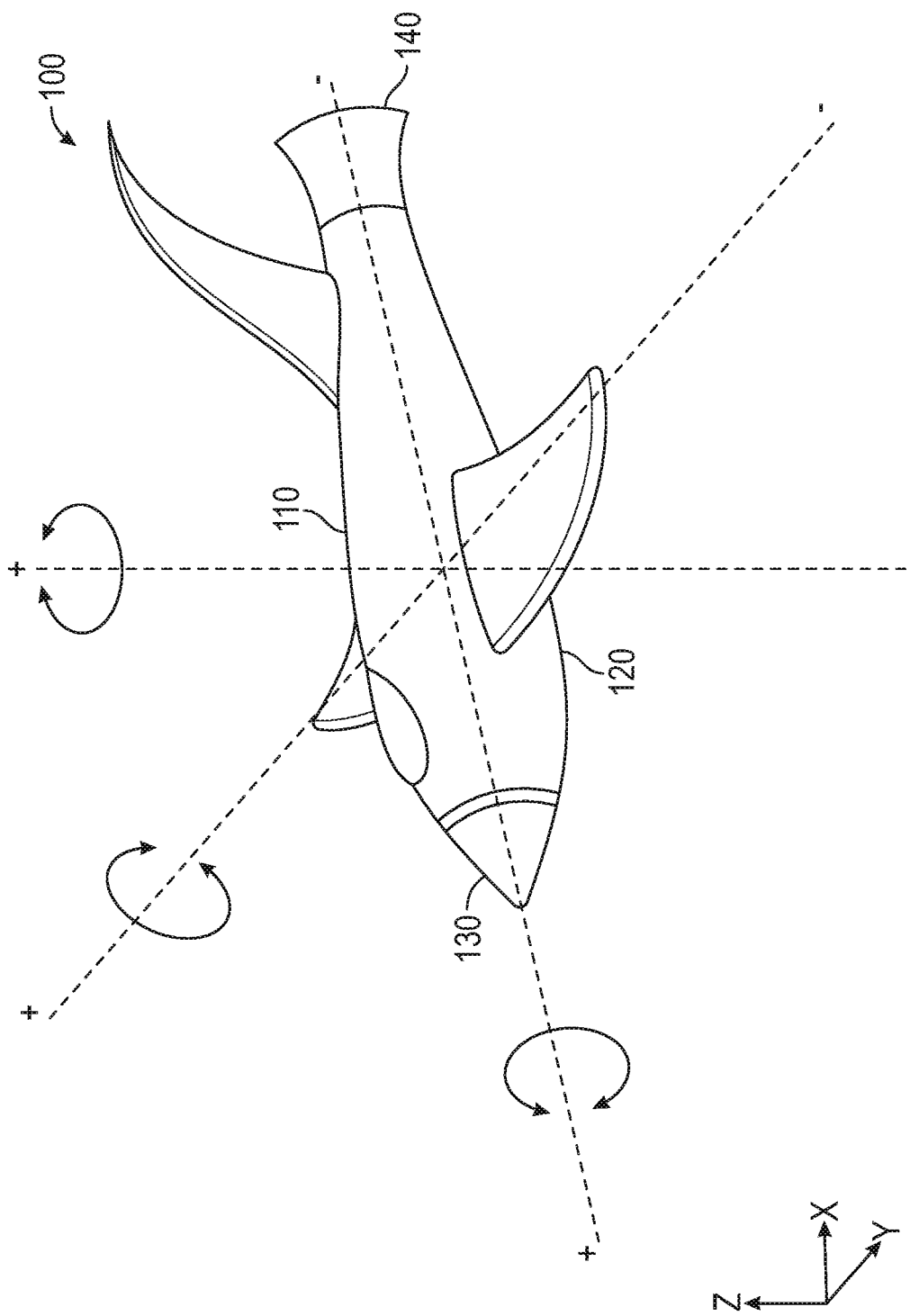

FIG. 1C illustrates one view of an example remotely controlled device of a drone resembling a rocket-ship, which is another example of a bot 100. A drone style bot 100 may move in several planes (e.g., flying through the air, submerging/surfacing in water), and FIG. 1C illustrates several concepts related to movement, navigation, and control of a bot 100. Although Cartesian coordinates are used to describe the motion of the bot 100, other coordinate systems may be used with internal or external references points (relative to the bot 100) in other embodiments.

A longitudinal axis runs from the front 130 of the bot 100 to the back 140 of the bot 100, and motion along the longitudinal axis may be classified as forward (positive) or backward (negative) along the longitudinal axis. Rotation about the longitudinal axis is referred to as roll.

A transverse axis runs from one side of the bot 100 to the other side of the bot 100, and motion along the transverse axis may be classified as leftward (negative) or rightward (positive). Rotation about the transverse axis is referred to as pitch.

A vertical axis runs from the top 110 of the bot 100 to the base 120 of the bot 100, and motion along the vertical axis may be classified as upward (positive) or downward (negative). Rotation about the vertical axis is referred to as yaw.

The longitudinal, transverse, and vertical axes are independent of the environmental X, Y, and Z axes used to map space in the environment. The bot 100 may track location and orientation in the environment via a tuple of X, Y, Z, yaw, pitch, and roll values. As used herein, the 6-tuple defines the position of the bot 100 in the environment, whereas the 3-tuple of (X,Y,Z) defines the location of the bot 100 in the environment, and the 3-tuple of (yaw, pitch, roll) defines the orientation of the bot 100 in the environment. The individual values in this 6-tuple may be based on a change relative to an initial starting position in the environment, one or more points of orientation in the environment, and combinations thereof. For example, the bot 100 may track pitch values relative to the visible horizon or an internal level/gyroscope; Z values relative to sea level, a starting altitude, an altitude relative to what is currently beneath the base 120 of the bot 100; X and Y values relative to a distance traveled from a starting point, a latitude/longitude; etc.

Figure 2:
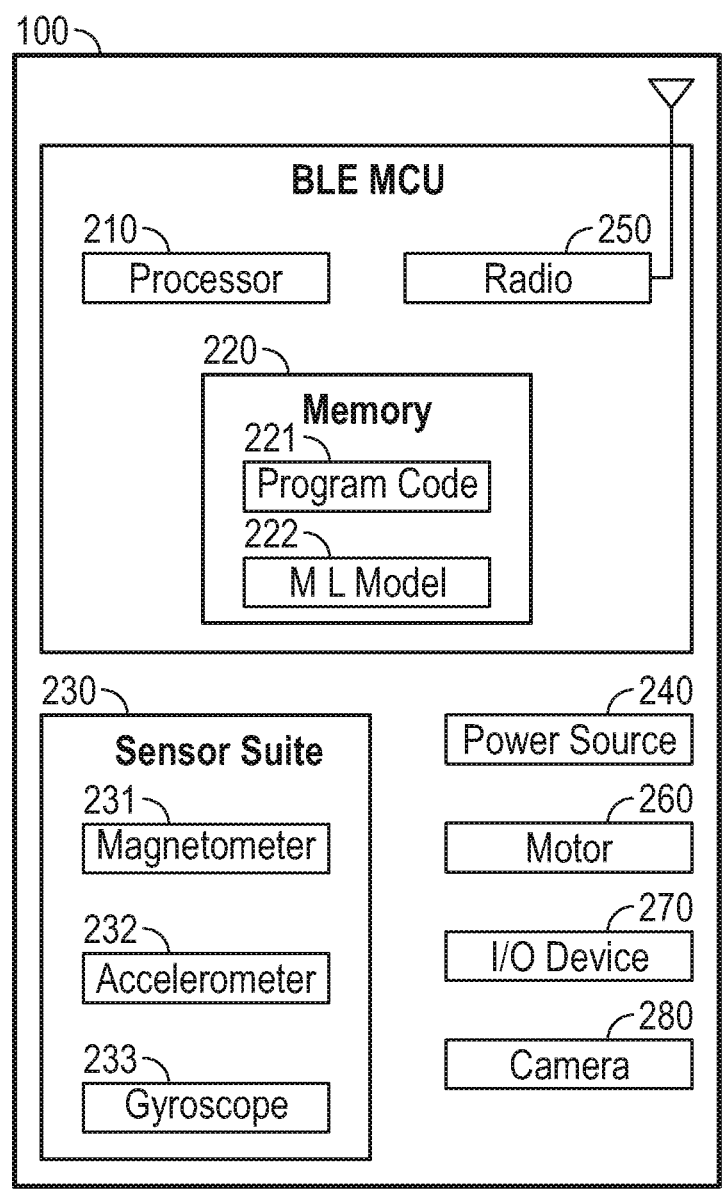
FIG. 2 is a block diagram of the internal components of a robotic action figure according to aspects of the present disclosure.

FIG. 2 is a block diagram of the internal components of a bot 100. The internal components of a given bot 100 may vary from those illustrated in FIG. 2, and several instances of each component may be included in a given bot 100. The internal components include a processor 210, a memory 220, a sensor suite 230, a power source 240, a motor 260, a radio 250, and may include other input or output devices 270 (e.g. LED, IR transmitter/receivers, speaker, buttons, microphones, light sensors, etc.), and a camera 280. In various embodiments, the processor 210, the memory 220, and the radio 250 may be integrated into a Microcontroller (MCU) on a single hardware chip or circuit board.

The processor 210 and the memory 220 provide computing functionality to the bot 100. The memory 220 may be one or more memory devices, such as, for example, Random Access Memory (RAM), Read Only Memory (ROM), flash memory, or any other type of volatile or non-volatile storage medium that includes instructions that the processor 210 may execute to affect the bot 100. The processor 210, which may be any computer processor capable of performing the functions described herein, executes commands included in the instructions, which may include performing certain tasks in response to signals received via the sensor suite 230 or the radio 250.

The memory 220 generally includes program code 221 for performing various functions related operating the bot 100. The program code 221 is generally described as various functional "applications" or "modules" within the memory 220, although alternate implementations may have different functions and/or combinations of functions. Within the memory 220, the program code 221 is generally configured to control the bot 100 in relation to commands from one or more users.

The sensor suite 230 may include a magnetometer 231, an accelerometer 232, and a gyroscope 233. The magnetometer 231 is a sensor that provides a bearing to a north pole of a magnetic field in the environment in which the bot 100 is present. The magnetometer 231 may thus provide the bot 100 with a directional sense in terms of yaw orientation with respect to magnetic north. The accelerometer 232, which measures acceleration forces acting on the bot 100, may provide the bot 100 with information of whether the bot 100 (or a portion of the bot 100) is moving, and in which direction(s). The gyroscope 233 measures orientation of the bot (or a portion of the bot 100), and may provide the bot 100 with information of whether the bot 100 (or portion of the bot 100) is level (e.g., whether the bot 100 is standing or has been knocked over). The combination of the accelerometer and gyro may thus provide the bot 100 with a direction sense in terms of pitch and roll with respect to gravity. The magnetometer 231 may be described as providing yaw information on the orientation of the bot 100 (e.g., how many degrees from north the front 130 is oriented), while the accelerometer 222 and gyroscope 233 provide information related to the pitch and roll of the orientation of the bot 100.

The sensor suite 230 may include additional sensors, several instances of each sensor, or may omit some of the example sensors discussed herein. For example, a bot 100 may include an infrared emitter and/or receiver to identify objects within the environment. In another example, the bot 100 may include a laser range finder sensor to determine a distance to an object from the bot 100 in the environment. In a further example, the bot 100 may include a camera sensor including image recognition software to identify objects within the environment and/or provide an image to a user from the perspective of the bot 100.

The power source 240 provides electric power to the various components of the bot 100. Various examples of power sources 240 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 240.

The radio 250 provides wireless communications for the bot 100. In some embodiments, the radio 250 is a receiver, which receives signals from external sources to inform how the bot 100 is to behave. In other embodiments, the radio 250 is a transmitter/receiver, which receives signals from external sources to inform how the bot 100 is to behave, and transmits signals to external devices (e.g., other bots 100, a paired controller for the bot 100). The radio 250 may be in communication with various antennas and may configure messages to be transmitted or received according to various standards, such as, Bluetooth Low Energy (BLE) or a proprietary standard.

The motors 260 included in the bot 100 are provided for locomotion and/or actuation of the bot 100. For example, a motor 260 connected with a drive wheel in the base 120 of the bot 100 may induce the bot 100 to move forward, in reverse, and/or turn left or right. In another example, a motor 260 connected as a pinion with a rack that is connected with one or more wheels may induce the bot 100 to steer when locomotion is supplied by another motor 260. In a further example, a motor 260 may induce a propeller to spin, providing lift and/or locomotive force for the bot 100. In various embodiments, the motors 260 are electrical motors that are selectively provided power from the power source 240 based on instructions executed but the processor 210. The motors 260 may provide locomotive force, actuation of various portions of the bot 100 (e.g., arms, legs, hands, necks), and/or vibration (e.g., rotating an off-centered weight). In some embodiments, the motors 260 include positional sensors to provide the processor 210 with information related to a rotational position affected by the motor 260 (e.g., rotated d degrees from a reference point).

The output devices 270 may include various lights, displays, speakers, LEDs, IR transmitters/receivers, buttons, microphones, light sensors, etc. for providing input and/or output from the bot 100 in addition to that provided by the motors 260 and/or radio 250. For example, a Light Emitting Diode (LED) is an output device 270 that provides a visual effect for the bot 100 when certain actions are performed by the bot 100. In another example, a speaker is an output device 270 that provides audio output (e.g., of a sound effect or voice recording) when certain actions are performed by the bot 100.

The camera 280 included in a bot 100 may provide visual sensing of the environment. For example, image and object recognition software on the bot 100 may use the camera 280 for collision avoidance, goal-seeking, environmental mapping, and navigation, among other uses. The camera 280 may also provide a user of a second device with a view of the environment from the perspective of the bot 100 via a video feed transmitted to the second device. The second device may combine a video feed from the camera 280 with game logic, or educational logic to provide the user with an Augmented Reality (AR) experience in association with the perspective of the bot 100, and/or the user of the second device may use the video feed to navigate the bot 100 as though flying/driving the bot 100.

Figure 3:
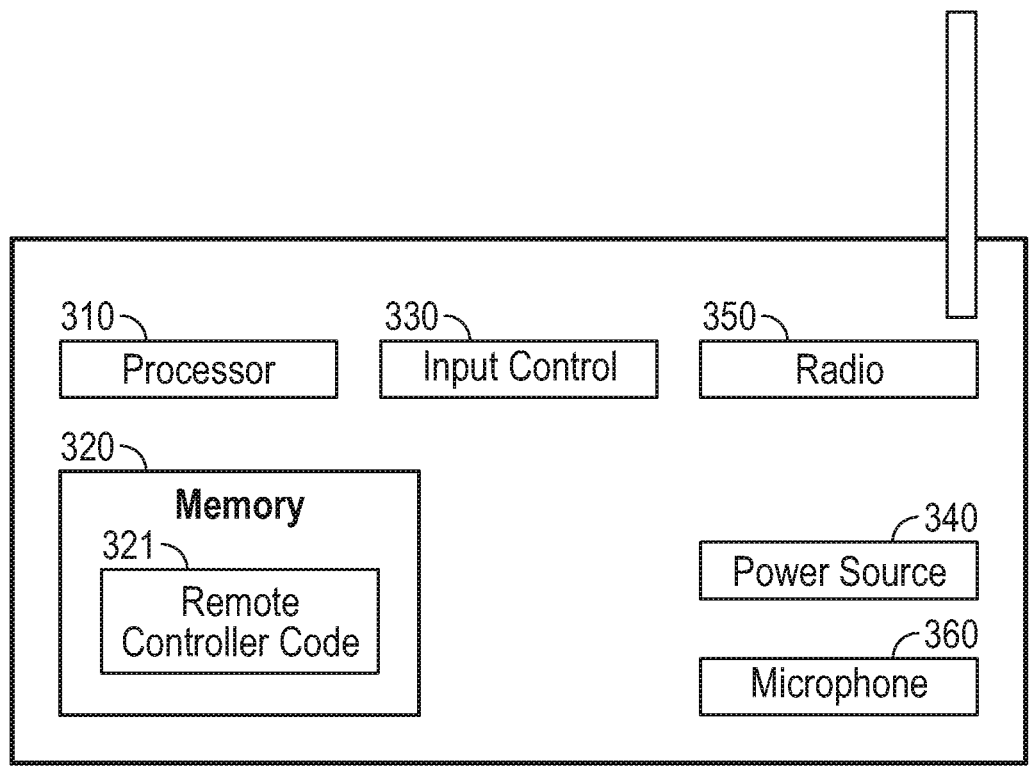
FIG. 3 illustrates an example Remote Control (RC) for use with a robotic action figure according to aspects of the present disclosure.

FIG. 3 illustrates an example Remote Control (RC) for use with a robotic action figure. A remote control may generally or collectively be referred to herein as an RC 300, RCs 300, or RCs 300n. Specific examples of an RC 300 may be distinguished from one another by various titles and postscripts after the associated element number (e.g., first RC 300a, second RC 300b). Each RC 300 may be primarily keyed to control one bot 100, and when specific examples of paired RC 300 and bots 100 are given herein, the given titles and subscripts for the given bot 100 and RC 300 will match. For example, Alex may control a first bot 100a using a first RC 300a, whereas Blake may control a second bot 100b using a second RC 300b, and Charlie may control a third bot 100c using a third RC 300c. A voice processor may be used herein to relay commands and/or utterances received at the RCs 300 to the bots 100.

The processor 310 and the memory 320 provide computing functionality to the RC 300. The memory 320 may be one or more memory devices, such as, for example, Random Access Memory (RAM), Read Only Memory (ROM), flash memory, or any other type of volatile or non-volatile storage medium that includes instructions that the processor 310 may execute to affect the bot 100 via the RC 300. The processor 310, which may be any computer processor capable of performing the functions described herein, executes commands based on inputs received from the input controls 330. In some embodiments, the memory 320 may queue instructions for transmission to the bot 100.

The memory 320 generally includes program code for performing various functions related operating the RC 300. The program code is generally described as various functional "applications" or "modules" within the memory 320, although alternate implementations may have different functions and/or combinations of functions. Within the memory 320, the remote controller code 321 is generally configured to provide functionality to remotely control the bot 100 in relation to commands from one or more users. In some embodiments, the remote controller code 321 is provided to manage inputs from a purpose-built RC 300 (i.e., a dedicated remote control), while in other embodiments the remote controller code 321 is provided to enable a general computing device (e.g., a smart phone, a tablet computer, a laptop computer) to provide control signals to a bot 100.

A voice processing code 322 included in the memory 320 (which may also be implemented on the bot 100) is configured to receive utterances from one or more microphones 360 included in the RC 300 and determine whether the utterance includes a command for the associated bot 100, and translates the command into machine instructions corresponding to the command. A machine learning model for natural language processing and/or voice recognition may be trained for use with the voice processing code 322 so that voiced utterances from a user may be appropriately mapped to desired commands and/or so that utterances from other users may be ignored. For example, by training the voice processing code 322 to recognize commands only from an associated user, two or more users may issue voice commands in the same environment to different devices without the commands interfering with the operation of the different devices. In another example, by training the voice processing code 322 to handle the vocal idiosyncrasies of a particular user, the voice processing code 322 may identify mappings between utterances and commands despite a speech impediment, strong accent, or atypical vocabulary of the user.

The RC 300 includes one or more input controls 330 to receive input from a user to thereby control the bot 100 at a distance. The input controls 330 may include physical joysticks, physical steering wheels/yokes, physical buttons, physical switches, and a touch interface that designates various regions for use as virtual joysticks, buttons, switches, etc. A user may manipulate the various input controls 330 to signal that the bot 100 is to perform a desired action (e.g., move forward, play an audio clip, steer to the right, raise an arm, twist), which the processor 310 may interpret and transmit to the bot 100 via the radio 350.

The power source 340 provides electric power to the various components of the RC 300. Various examples of power sources 340 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 340.

The radio 350 provides wireless communications for the RC 300. In some embodiments, the radio 350 is a transmitter, which transmits signals to external devices (e.g., bots 100) to inform how a bot 100 is to behave. In other embodiments, the radio 350 is a transmitter/receiver, which receives signals from external sources (e.g., bots 100 and other RCs 300) to inform how a given bot 100 or RC 300 is behaving, and transmits signals to external devices. The radio 350 may be in communication with various antennas and may configure messages to be transmitted or received according to various standards, such as, BLE or a proprietary standard.

Figure 4:
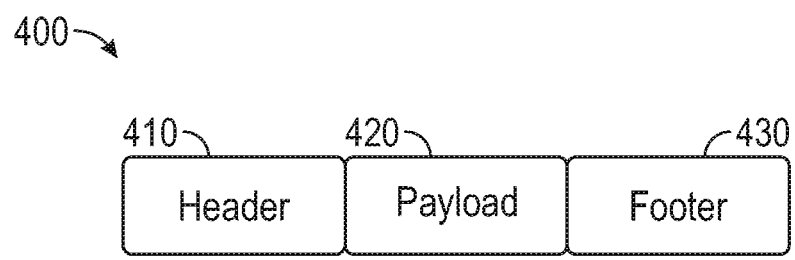
FIG. 4 illustrates an example packet which may be used in various embodiments according to aspects of the present disclosure.

FIG. 4 illustrates an example packet 400 which may be used in various embodiments. The packet 400 represents a formatting for data that are transmitted between a bot 100 and an RC 300. The packet 400 includes a header 410, a payload 420, and a footer 430. The data in the packet may be formatted as analog or digital values, and the packet 400 may be transmitted via one or more of Amplitude Modulation (AM), Frequency Modulation (FM), or Phase Modulation (PM) in various frequency bands according to the standard selected for communication between the bots 100 and RCs 300.

The header 410 represents a portion of the packet 400 that is transmitted/received first in the packet 400. The header 410 may contain information related to the sender, the intended destination, the standard used to transmit the packet 400, a length of the packet 400, whether the packet 400 is one of a series of packets 400, error detection/correction information, etc. The device that receives the packet 400 may examine the header 410 to determine whether to read the payload 420 or ignore the packet 400. For example, a first bot 100a and a second bot 100b may both receive a packet 400 and analyze the header 410 to determine whether the packet 400 includes a payload 420 that the given bot 100 should execute.

The payload 420 includes the data, commands, and instructions In various embodiments, one packet 400 may be the payload 420 of another packet 400. For example, an RC 300 may transmit an outer packet 400 formatted according to a first standard with a payload 420 of an inner packet 400

The footer 430 represents a portion of the packet 400 that is transmitted/received last in the packet 400. The footer 430 may contain information related to the sender, the intended destination, the standard used to transmit the packet 400, a length of the packet 400, whether the packet 400 is one of a series of packets 400 (e.g., to expect a payload 420 divided across at least one subsequent packet 400), error detection/correction information, etc. The device that receives the packet 400 may examine the header 430 to determine whether to read the payload 420 or ignore the packet 400. In various aspects, and depending on the format used for the packet 400, the footer 430 may be omitted.

A packet 400 transmitted from a given bot 100 or a given RC 300 may be received by various other bots 100 or RCs 300. As used herein, the bots 100 or RCs 300 that receive the signal and successfully extract the message from the signal are referred to as "in range" (and variations thereof) of the transmitting device. A device may use one or more of a signal strength, a checksum, or a message format to determine whether the message has been successfully extracted from the signal. When using multiple devices, not all devices need to be in range of one another for the devices to interact. For example, a first bot 100a and a second bot 100b may both be in range of a first RC 300a and a second RC 300b and may interact with one another without needing the first RC 300a and the second RC 300b to be within range of each other. Individual in-range devices may act as repeaters for devices out of range of one another (i.e., re-transmitting the message received from a first transmitter to reach devices out of range of the first transmitter but in range of the repeater device) or devices out of range of one another may operate independently of the signals from out of range devices.

Several devices may be in range of a transmitting device, and may determine whether to execute or ignore any instructions included in the message. For example, with a first bot 100a, a second bot 100b, and a second RC 300b all in range of a first RC 300a, the first bot 100a may execute instructions included in a message from the first RC 300a while the second bot 100b and the second RC 300b may ignore the message. A receiving device may determine whether to execute or ignore a message based on one or more of: an identifier in the header 410 of a packet 400 of the message (identifying a sender, an intended receiver, or a message type), a time at which the message was received, a frequency of the signal used to transmit the message, a voiceprint of an associated user, or the like.

Figure 5:
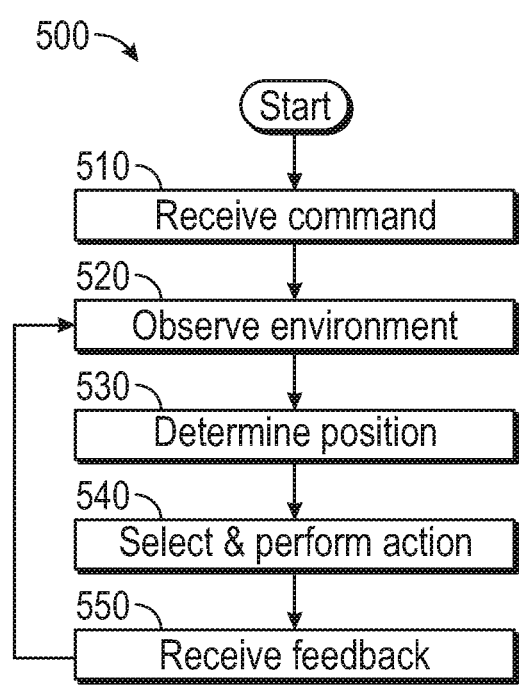
FIG. 5 illustrates a method for voice control for autonomous drone play and directional alignment, according to aspects of the present disclosure.

FIG. 5 illustrates a method 500 for voice control for autonomous drone play and directional alignment. Method 500 may be preceded by a user recognition training processes, in which a given device learns how to map utterances from a user to commands to perform by the bot 100.

Method 500 begins at block 510, where the bot 100 receives the command. In some embodiments, the RC 300 receives an utterance, maps the utterance to one or more commands, and transmits a packet 400 corresponding to the one or more commands to the bot 100 to perform. In other embodiments, the RC 300 transmits a packet 400 with the utterance to the bot 100 for the bot 100 to map to one or more commands to perform. In further embodiments, the bot 100 receives a manually indicated command (e.g., a command associated with actuation of a button, joystick, mouse, etc.) that triggers a command to perform.

In method 500, the command to perform is a behavior command, although action commands may also be received and performed by the bot 100. An action command is a command for the bot 100 to perform a user-directed action; the user determines where the bot 100 moves, how the bot 100 moves, the effects generated by the bot 100, etc. A behavior command, in contrast to an action command, sets the bot 100 on an autonomous course of one or more actions that are selected from a machine learning model and performed by the bot 100 in sequence. In some embodiments, the machine learning model is stored on the RC 300, which receives the utterance, maps the utterance to a behavior command, and selects one or more actions commands for the bot 100 to perform based on the machine learning model, which are then transmitted in sequence to the bot 100. In other embodiments, the machine learning model is stored on the bot 100, which receives the utterance or mapped behavior command from the RC 300 (or via a microphone from the user), and determines via the machine learning model the actions to perform.

The autonomous selection of the actions to perform uses a machine learning model stored in the memory 220 of the bot 100 or the memory 320 of the RC 300 to determine one action to perform from several potential actions. A reinforcement learning model, such as a Markov chain, defining various probabilities for the selection of individual actions for the bot 100 to perform may be developed to set the behavior of the bot 100. In some embodiments, the behavior command specifies a series of actions to perform with 100% probability (absent interrupting commands/feedback), as a complex behavior command. In other embodiments, the behavior command specifies a preference for the selection of some actions over others to perform; adjusting the probabilities of which individual actions are chosen to perform until the preference is overridden, decays (times out), or is no longer applicable for the current state of the bot 100.

At block 520, the bot 100 observes the environment. One or more sensors on the bot 100 may be used to identify various objects in the environment, such as, for example, obstacles, play field boundaries, a user, another bot 100, walls, the ground, the horizon, etc. The bot 100 may use a camera, laser range finder, sonic range finder, radio (for beacons of known location, or signal strength analysis) among other sensors included in the bot 100 to observe the environment. The environment, and the objects identified therein, are used to update the machine learning model. For example, the bot 100 may use the boundaries of a play area when determining a location to move to in the environment. In another example, the bot 100 may use the proximity of another bot 100 to determine an orientation, speed, and/or direction of travel, so as to avoid collisions. The bot 100 may plot a projected course for each object detected in the environment via the current and past positions determined for that object.

At block 530, the bot 100 determines the position of the bot 100 in the environment. The bot 100 may determine a location in the environment relative to a reference point in one or more coordinate systems and compare the location against the locations of various objects identified at block 520. The bot 100 may determine an orientation in the environment based on readings from a magnetometer 231 (e.g., yaw relative to magnetic north), and accelerometer 232 and a gyroscope 233 (e.g., pitch and roll relative to gravity). The bot 100 may determine a current speed based on throttle information provided by sensors associated with one or more motors 260, wind speed sensors, past-plotted locations, and/or the accelerometer 232. The bot 100 may plot a projected course for itself via the current and past positions determined for the bot 100.

At block 540, the bot 100 selects and performs the one or more actions based on the behavior command received at block 510, the environmental observations collected at block 520, and the positional data determined at block 530, and the machine learning model. The action is selected stochastically from the available actions given the current status of the bot 100 in the environment, and the behavior command influences, but does not direct which action is selected. For example, a bot 100 running a maze may have various action available (e.g., go north, go south, go east, go west) and various probabilities of performing a given action (e.g., 20% northward, 10% southward, 30% eastward, 40% westward).

Continuing the maze runner example, a behavior command to "explore" may normalize the directional movement preferences (e.g., to 25% for each direction) while a behavior command to "escape" may de-prioritize backward movements (e.g., a bot 100 that moves northward has a reduced chance of moving southward next, that moves eastward has a reduced chance of moving westward next, etc.).

At block 550, the bot 100 receives feedback on the action taken at block 540, which affects the machine learning model and the next action the bot 100 will take. Feedback may be real-time or after-action. The feedback further adjusts the probabilities of the machine learning model. For example, if a complex behavior command of "take off" is issued to a bot 100 of an aircraft-like drone, the bot 100 will attempt to rise into the air (e.g., 100% chance to move upward), but may stop rising (or land) if an obstacle is detected or a countermanding order is provided (e.g., setting the chance to move upward to 0%, at least temporarily). In another example, a bot 100 may have a 50% chance of moving to the left and a 50% chance of moving to the right when directed to "turn," by the user, but may be influenced by feedback from the environment (e.g., a wall, a track, another bot 100) to turn to one side or the other at a particular time (e.g., to stay on the track). In a further example, a bot 100 may determine to activate a motor 260 at a certain operational speed, but receives feedback of "faster!" from the user, and the probability to increase the operating speed of the motor 260 may increase; the bot 100 however retains control over whether to increase speed (e.g., due to input from the scenario to the machine learning model).

Method 500 returns to block 520 to continue acting on the feedback. Method 500 may conclude in response to a new behavior command (restarting at block 510), the behavior running a course, or the user taking direct control of the bot 100.

FIGS. 6A-C illustrate timing and positional diagrams for a series of actions being taught to a drone to perform in response to a behavioral voice command. The bot 100 is taught various complex series of actions to perform as a behavior in response to a command from the user via reinforcement learning in a machine learning model stored by one of the bot 100 or the RC 300 paired with the bot 100. The user provides an utterance to associate with the complex behavior command, and walks the bot 100 through a series of directed actions that are to be mapped, in sequence, to the complex behavior command so that when the user next speaks the utterance, the bot 100 will repeat the sequence of directed actions as a single complex behavior. The user may refine or overwrite the series of actions via reinforcement feedback.

FIG. 6A illustrates the timing and positioning of a bot 100 with a user issuing individual action commands for the bot 100 to associate as a complex behavior command. In the illustrated example, the user has assigned the utterance of "juke!" for the complex behavior command, and provides a series of utterances (although manual commands may also be used in other embodiments) associated with the individual actions that are to be included in a "juke" as defined by the user. In the illustrated example, the user provides utterances for the bot 100 to move: "right", "right", "right", "down", "down", "down", "pivot left", and "accelerate" when juking. In some embodiments, the bot 100 performs the actions comprising the complex behavior action, while in other embodiments the bot 100 may internalize the commands without performing those commands when learning a complex behavior action. Each of the action commands issued as sub-commands for the complex behavior command may be associated with base behaviors, for example, each command may operate at a base speed and a base duration, which may be influenced or set by the machine learning model used by the bot 100.

FIG. 6B illustrates the timing and positioning of a bot 100 performing the complex behavior command taught in FIG. 6A in response to the user providing the utterance of "juke!". The bot 100 receives the command at $t_0$, and moves rightward from time $t_2$ to $t_3$, rightward again from $t_4$ to $t_5$, rightward from $t_6$ to $t_7$, downward from $t_8$ to $t_9$, downward from $t_{10}$ to $t_{11}$, downward from $t_{12}$ to $t_{13}$, pivots leftward from $t_{14}$ to $t_{15}$, and accelerates forward from $t_{16}$ to $t_{17}$. The user may end the learning behavior at time $t_{18}$, such as, for example via a command to "end Juke". The user may later provide feedback to the bot 100 in some of the timeslots in which the actions are performed. This feedback may be used in real-time (affecting the current performance) and/or may be used as after-action feedback (affecting the subsequence performance(s)). The feedback provided may be parsed for intent, and applied to the actions as an adjustment, an addition, a subtraction, or a refinement of the series of actions learned for the complex behavior.

In an example of adjustment feedback, the user provides the utterance of "wider!" in the timeslot from $t_2$ to $t_3$, which is taken as feedback that the bot 100, when moving rightward, should move rightward even more than in the current performance. Feedback that adjusts a behavior may be capped to the operational parameters of the bot 100. For example, a bot 100 may be urged to go faster, but if already at maximum throttle, may not respond to the adjustment feedback. In another example, the user provides the utterance of "tighter" at time $t_{15}$, and the bot 100 responds by reducing (or eliminating) the length of pauses between the actions making up the complex behavior performed by the bot 100.

In an example of addition feedback, the user provides the utterance of "Spin!" in the timeslot from $t_6$ to $t_7$, and the bot 100 begins to spin (yaw) at such time. The addition feedback adds an additional action within or at the end of the series of actions for the complex behavior. In contrast, subtraction feedback may remove an action from the series of actions performed by the bot 100 or forbid the bot 100 from performing a given action. For example, in the timeslot from $t_{14}$ to $t_{15}$, the bot 100 may be told to "stop spinning!" and will cease performing the spin actions at such time.

FIG. 6C illustrates the timing and positioning of a bot 100 performing the complex behavior command taught in FIG. 6A in response to the feedback received in relation to FIG. 6B. Again, the bot 100 receives the command at $t_0$, and moves rightward from time $t_2$ to $t_3$, rightward from $t_3$ to $t_4$, rightward from $t_4$ to $t_5$, downward from $t_5$ to $t_6$, downward from $t_6$ to $t_7$, downward from $t_7$ to $t_8$, pivots leftward from $t_8$ to $t_9$, and accelerates forward from $t_9$ to $t_{10}$. As will be noticed, the positional and timing information for the bot 100 indicates that the bot has internalized the feedback from the user, including the "tighter" command, which removed the pauses between actions. For instance, in response the feedback of "still wider" received in time $t_2$ to $t_3$, the bot 100 may have increased the amount to time that the bot 100 moves for between $t_2$ and $t_3$ and $t_3$ to $t_4$ (e.g., from 0.1 s to 0.2 s) or the speed at which the bot 100 moves at (e.g., from 15 m/s to 17 m/s) to affect a greater change in location in FIG. 6C than in FIG. 6B.

In an example of refinement feedback, the user issues the utterance of "still wider" in timeslot in time $t_2$ to $t_3$, which the bot 100 internalizes via the machine learning model to further adjust how wide the bot 100 moves during an rightward movement action. The user may perform many successive rounds of feedback, adjusting through reinforcement of desired behaviors and discouragement of undesired behaviors, how the bot 100 performs the complex behavior command.

Figure 7A:
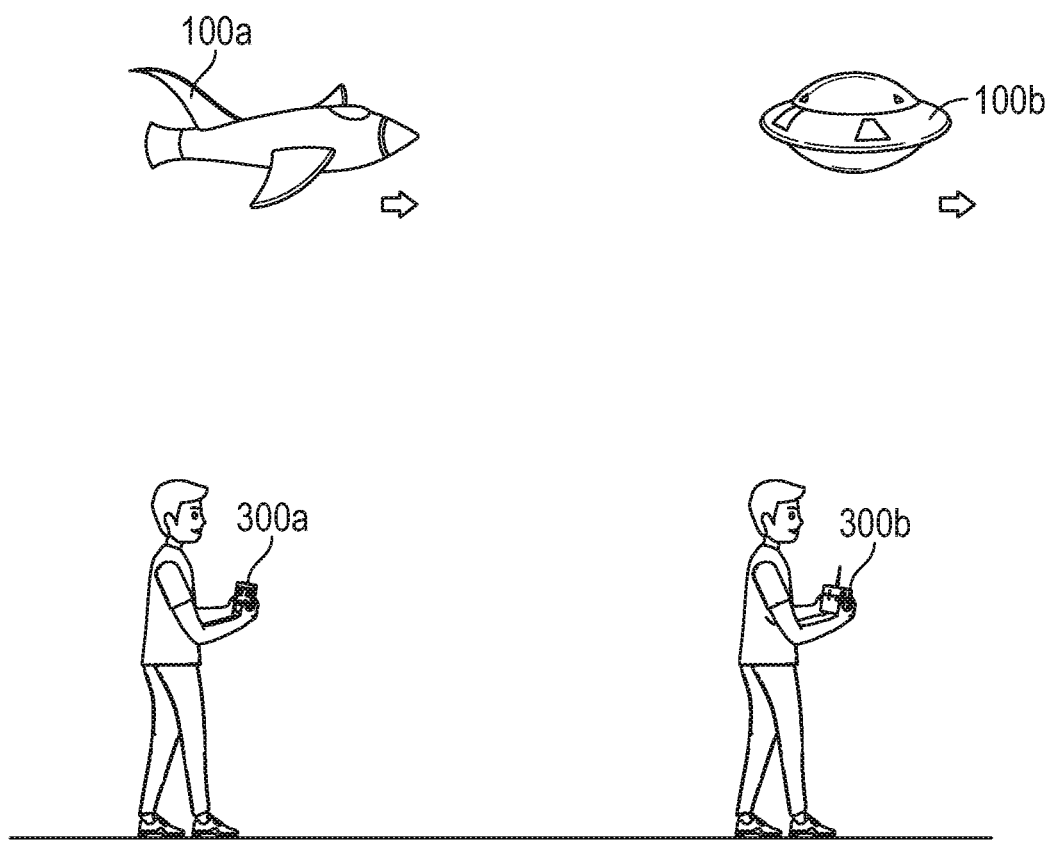
FIGS. 7A-H illustrate a series of actions for a drone responding to a behavioral voice command according to aspects of the present disclosure.

FIGS. 7A-H illustrate a series of actions for a drone responding to a behavioral voice command. In FIG. 7A, two users are shown using two RCs 300 to interact with individual bots 100. The first user is using the first RC 300a of a smartphone to issue voice commands to the first bot 100a, and the second user is using the second RC 300b of a designated remote control to issue voice commands and manual commands to the second bot 100b. In other embodiments, more or fewer users may be present with more or fewer bots 100 and/or RCs 300, and bots 100 may receive voice commands directly from the user instead of or in addition to from the RCs 300.

Figure 7B:
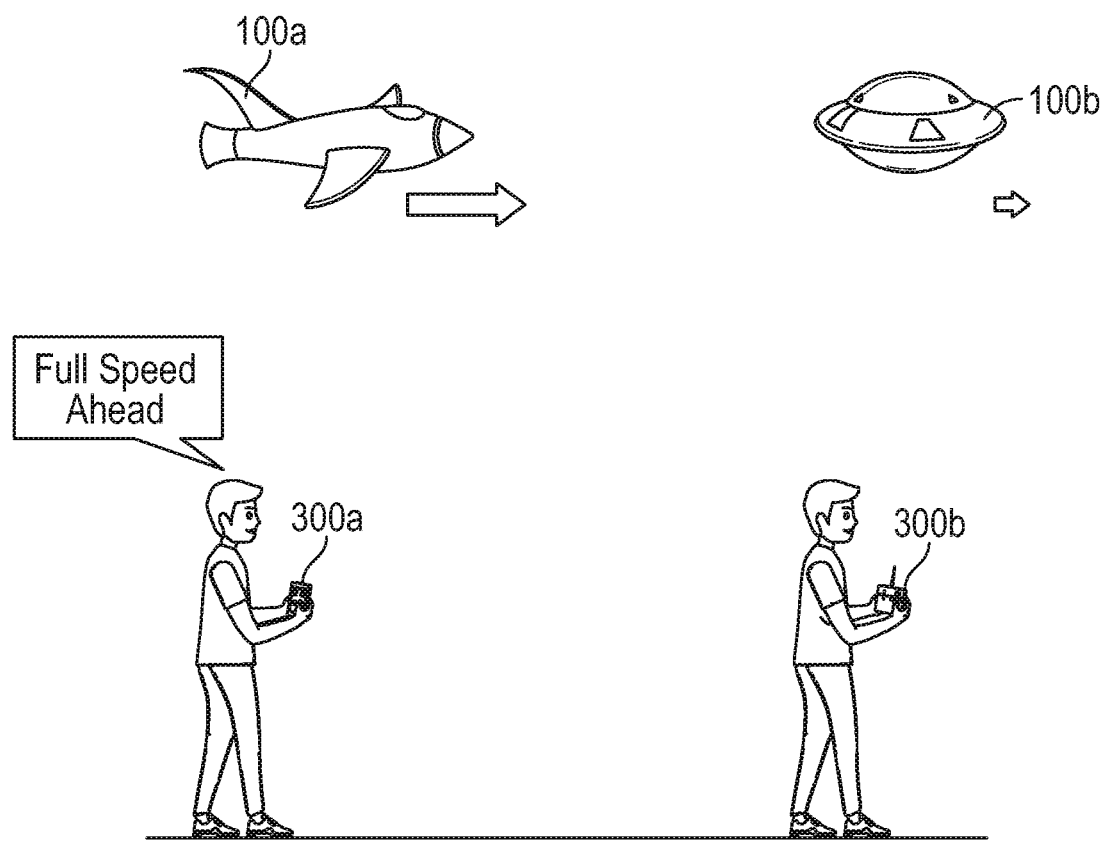

FIG. 7B illustrates the first user issuing an action command to the associated first bot 100a. The user speaks the utterance "full speed ahead!", which is interpreted to increase the throttle of the first bot 100a to the maximum speed. This action command may be associated with several sub-actions in addition to increasing the throttle of the first bot 100a, such as, for example, playing a sound effect, sweeping wings into a cruise position, engaging an LED associated with an "afterburner", or the like. An action command may be associated with a one-time effect on the associated bot 100a, regardless of how many sub-actions are taken in response. Examples of action commands include, adjusting steering, adjusting speed, initiating a sound or light effect, taking a picture, activating/deactivating a sub-system, etc.

Figure 7C:
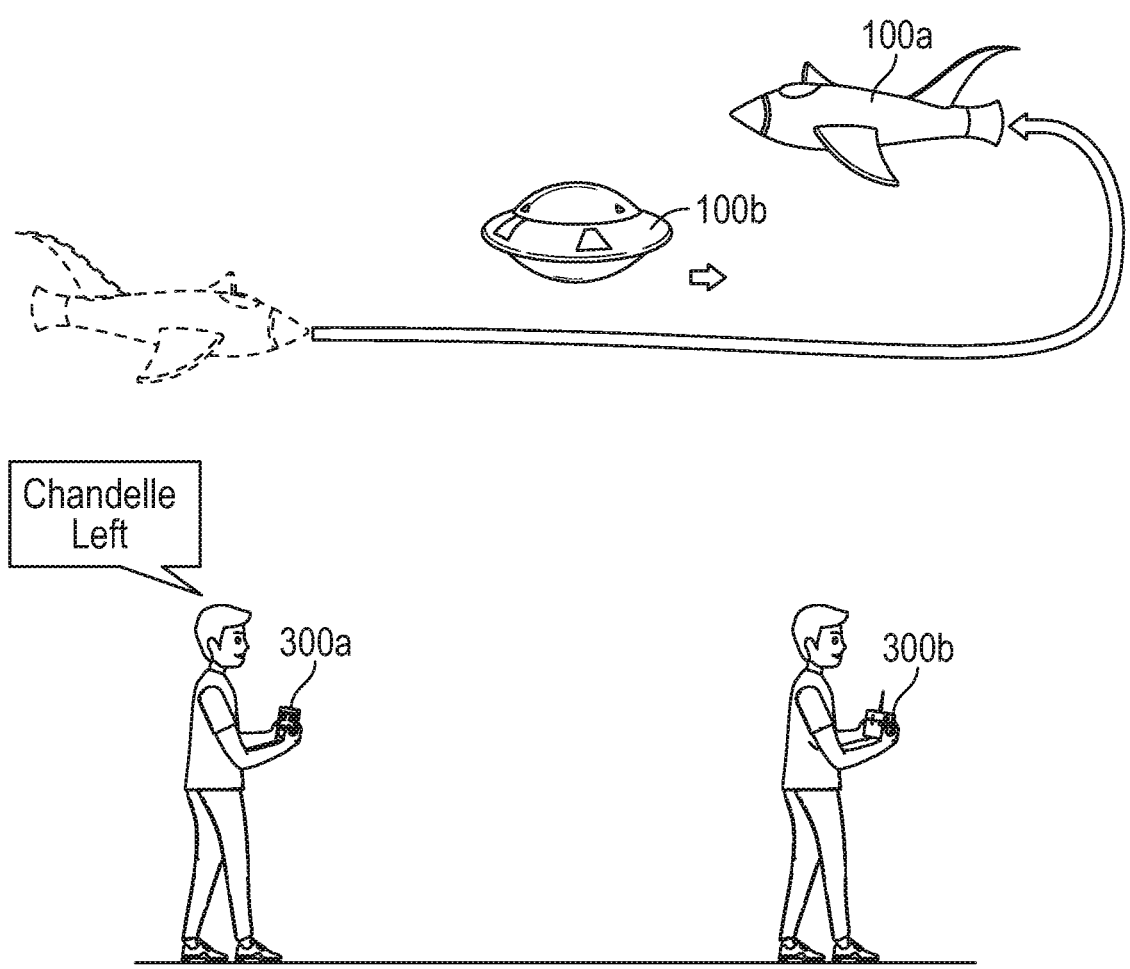

FIG. 7C illustrates the first user issuing a behavior command to the associated first bot 100a. The user speaks the utterance of "Chandelle left!", which is interpreted to indicated that the first bot 100a is to perform a Chandelle turn to position itself on a new heading leftward of the original heading. A Chandelle is a control maneuver in which an aircraft combines a climb (increase in altitude) with a 180° turn (to the left or to the right). To perform a Chandelle at different speeds or different altitude gains, the craft may bank into the turn with varying levels of roll and pitch. The Chandelle is one example of a behavior command of a complex (and interlocked) series of action commands that are autonomously taken on behalf of the user in response to the voice command.

Figure 7D:
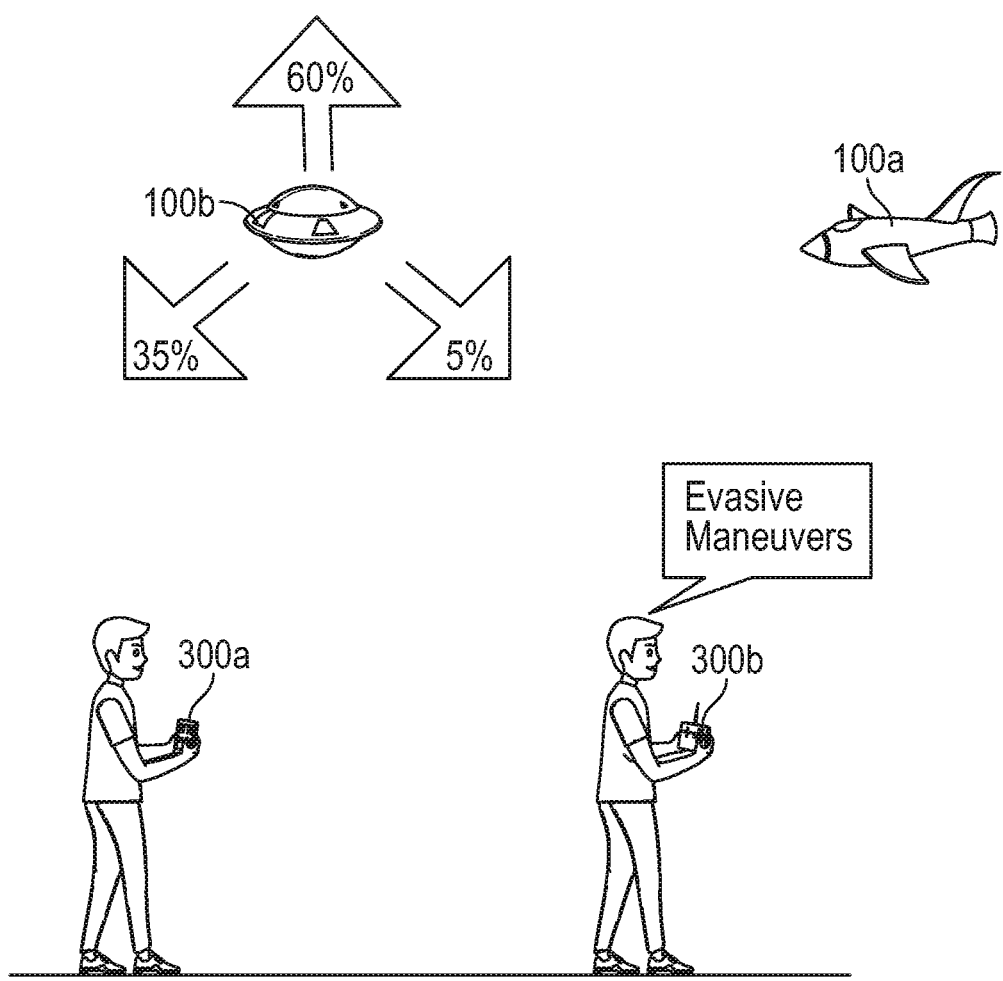

FIG. 7D illustrates the second user issuing a behavior command to the associated second bot 100b. The user speaks the utterance of "evasive maneuvers!" in response to seeing the first bot 100a bearing down on the second bot 100b after the Chandelle. The utterance of "evasive maneuvers!" is interpreted to indicate that the second bot 100b is to move out of the line-of-sight of the first bot 100a to avoid being tagged by the first bot 100a. The behavior command associated with "evasive maneuvers" passes movement control to the second bot 100b, so that the second bot 100b may select a series of locations and orientations to move to that are believed to avoid the first bot 100a. For example, the second bot 100b may evaluate several options 710 for actions to perform that are "evasive maneuvers". Each option may be associated with a learned weight based on past feedback, and the machine learning model may probabilistically choose one option based on the weights. In the illustrated example, the machine learning model will pick the option to evade by increasing altitude 60% of the time, evade by decreasing altitude and flying towards the other bot 100 5% of the time, and evade by decreasing altitude and flying away from the other bot 100 35% of the time.

Figure 7E:
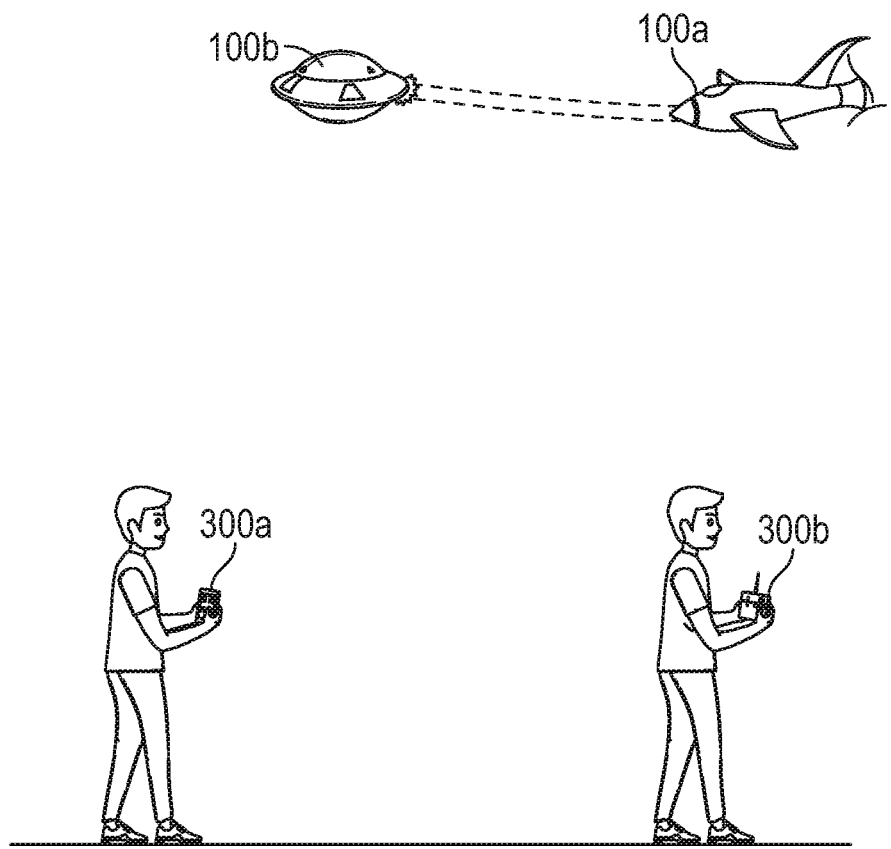
Figure 7F:
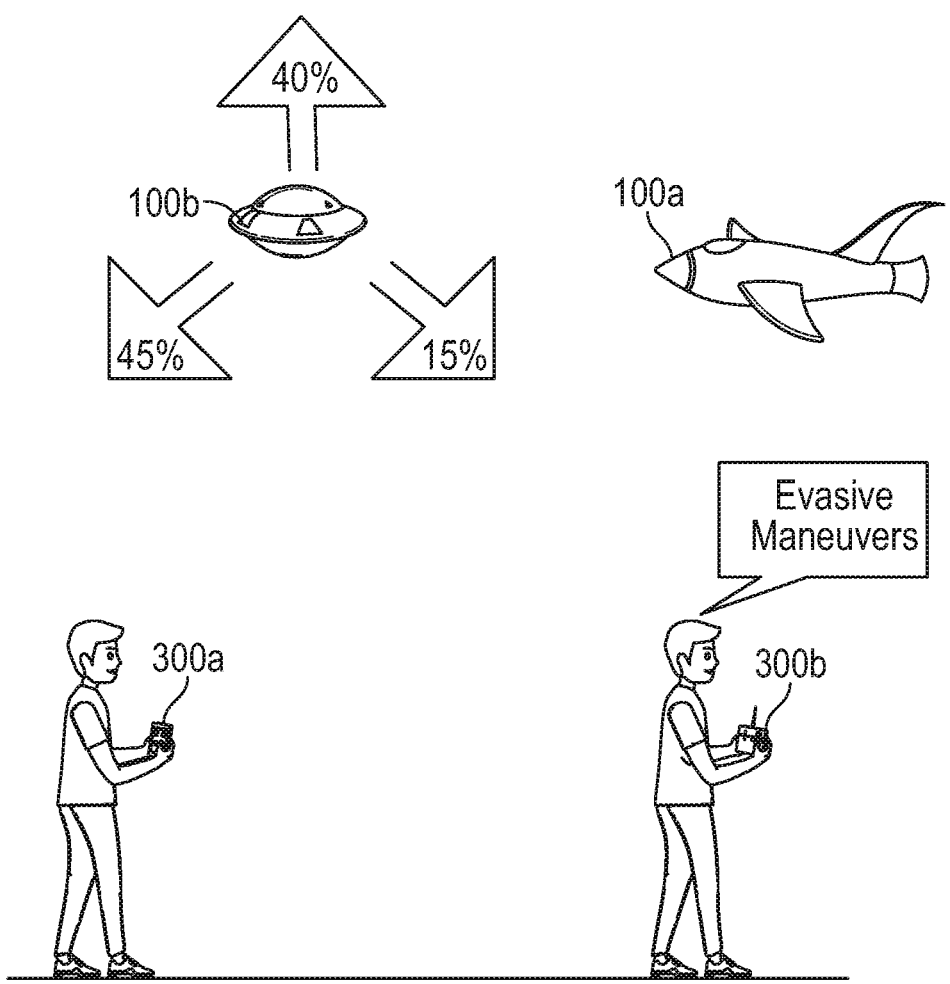

FIG. 7E illustrates that the second bot 100b has evaded by flying upward, but has been 'zapped' by the first bot 100a; indicating that the evasive maneuvers selected and performed by the second bot 100b were not effective in avoiding the first bot 100a. For example, the first bot 100a may project an IR beam corresponding to a "zapper ray" that the second bot 100b receives at one or more IR receivers as feedback within the scenario. This feedback has been received from another device (i.e., the first bot 100a) and the scenario, interpreting that being zapped is a negative outcome, and is internalized by the second bot 100b in a machine learning model to alter future actions autonomously selected by the second bot 100b in response to the behavior command for evasive maneuvers. In various embodiments, the feedback may include relative positions of the bots 100 in the environment at the time the behavior command was received, action(s) chosen in response to the behavior command FIG. 7F illustrates the second user issuing a behavior command to the associated second bot 100b. The second user speaks the utterance of "evasive maneuvers!," as spoken earlier in regard to FIG. 7D, in response to seeing the first bot 100a again bearing down on the second bot 100b. The utterance of "evasive maneuvers!" is interpreted to indicate that the second bot 100b is to move out of the line-of-sight of the first bot 100a to avoid being tagged by the first bot 100a. The feedback received by the second bot 100b after the earlier failed evasive maneuvers has altered the learned weights for the example options. In the illustrated example, the machine learning model will pick the option to evade by increasing altitude 40% of the time, evade by decreasing altitude and flying towards the other bot 100 15% of the time, and evade by decreasing altitude and flying away from the other bot 100 45% of the time.

Figure 7G:
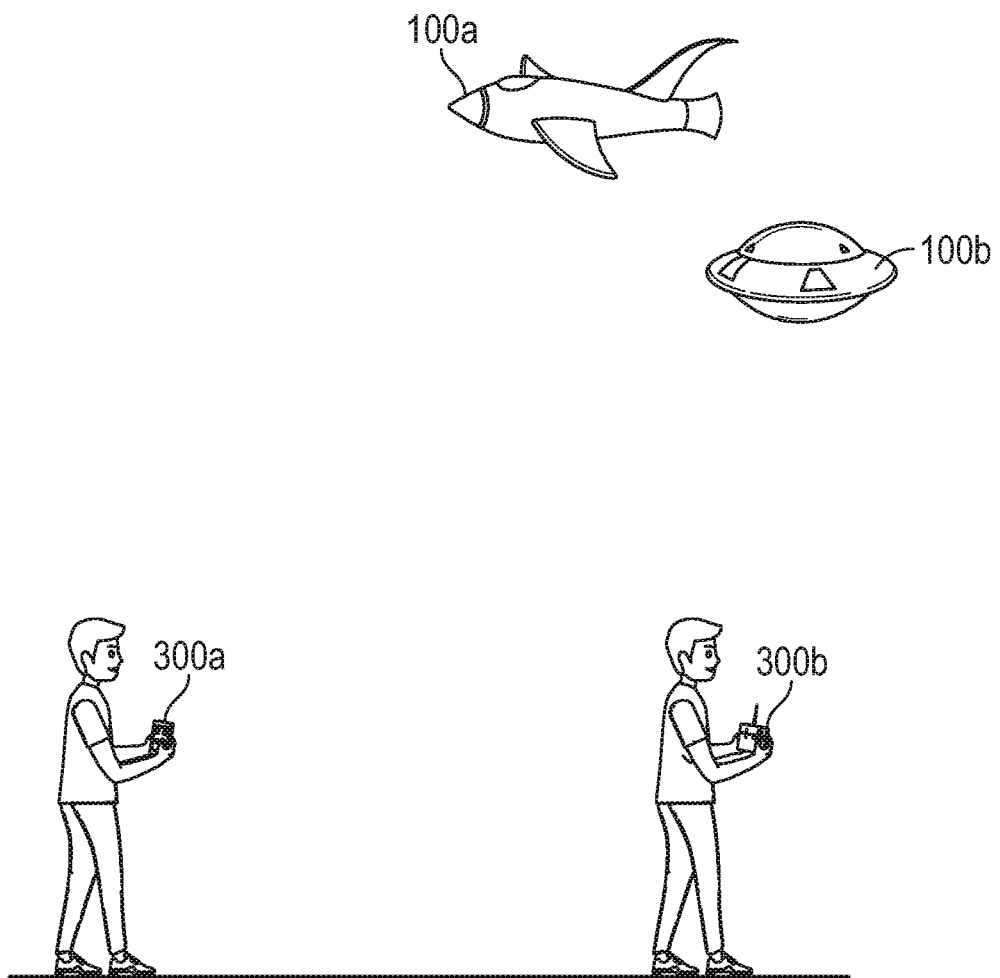

FIG. 7G illustrates that the second bot 100b has evaded the first bot 100a by decreasing altitude and flying towards the first bot 100a; successfully evading being "zapped". The second bot 100a may receive the lack of being zapped as positive feedback in the choice of maneuver or may receive positive feedback from the user (e.g., verbal praise or input via an approval button), thus increasing the likelihood of the second bot 100b selecting this option again in response to future commands to perform evasive maneuvers.

Figure 7H:
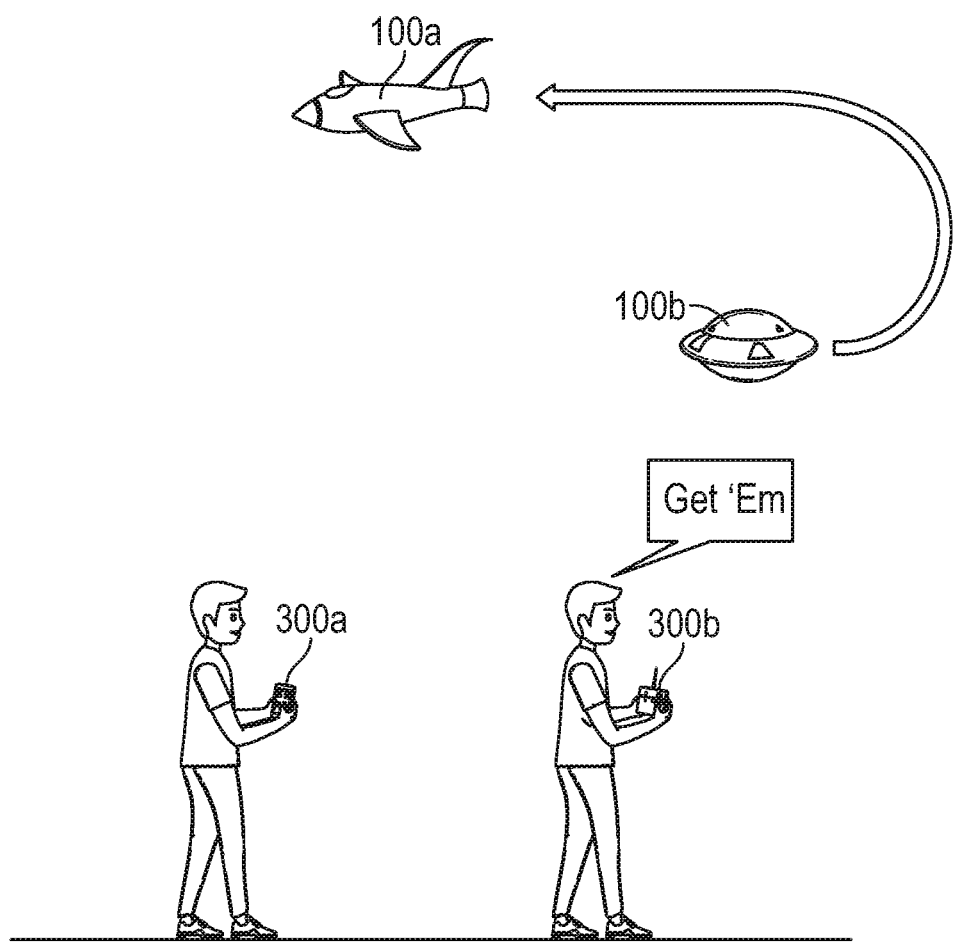

FIG. 7H illustrates the second user issuing a behavior command that receives feedback in real-time. The second user speaks the utterance of "get'em!", which is interpreted by the second bot 100b to perform autonomous actions to pursue the first bot 100a. The second bot 100b may attempt to maneuver to follow the flight path of the first bot 100a, but detects the presences of an object in its own flight path, which is used as real-time feedback to adjust the flight path of the second bot 100b. For example, a camera sensor or range finder sensor may identify an obstacle in the selected path for the second bot 100b, which is used as real-time feedback to avoid collisions. In some embodiments, real-time feedback may have no effect of the machine learning model. In other embodiments, real-time feedback may positively or negatively affect the weights of various bot-chosen actions. For example, the second user may urge the second bot 100b "faster!", which affects the performance of the actions of the second bot 100b in real-time, and may affect the speed at which the second bot 100b performs actions in the future.

FIGS. 8A-E illustrate a series of actions for a group of robotic action figures responding to a behavioral voice command. In FIGS. 8A-E, a first user may issue behavioral voice commands to a swarm of bots 100 comprising a first team of bots 100 that autonomously (from one another) determine how to implement the commands issued from the first user. A second user in FIGS. 8A-E may issue behavioral voice commands to a swarm of bots 100 comprising a second team of bots 100 that autonomously (from one another) determine how to implement the commands issued from the second user. In some embodiments, the users may issue behavioral commands to all of the bots 100n on the respective teams, but may issue action commands to only one bot 100 at a time; allowing for direct control of one bot 100 per team, and autonomous behavioral control of the other bots 100n.

Figure 8A:
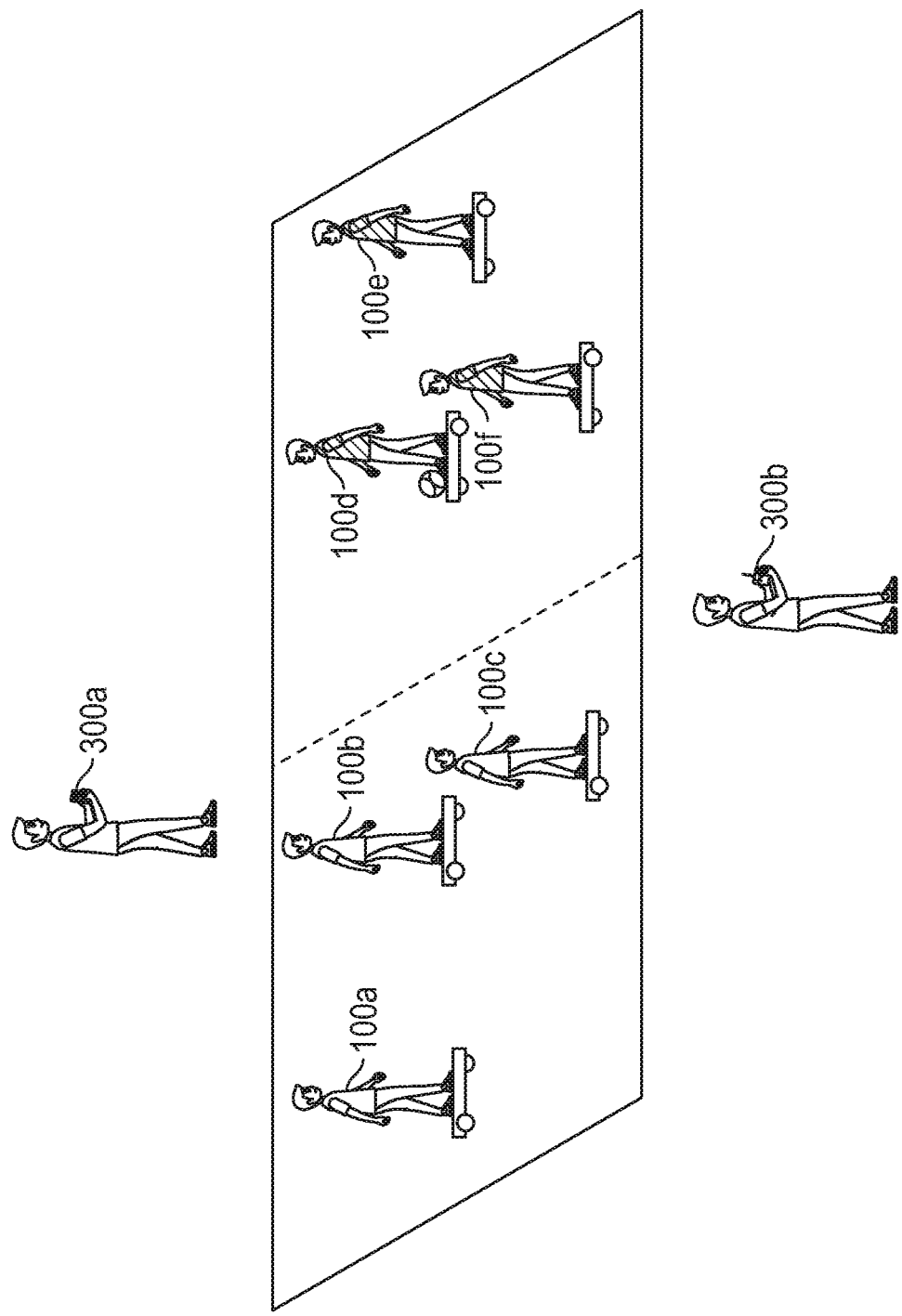

FIG. 8A illustrates an initial state of the two teams of bots 100, with the bots 100 belonging to the first team shown in solid white uniforms, and the bots 100 belonging to the second team shown in striped uniforms. The first team is controlled by voice commands received from a first user, and the second team is controlled by voice commands received from a second user. An RC 300 or the bots 100 associated with a given user may be taught during an initialization phase to recognize the vocal patterns of the given user so that verbal commands received (i.e., overheard) from the other user(s) are ignored. In addition to verbal commands, non-verbal commands for either actions or behaviors may also be provided to the bots 100. The two teams are illustrated playing a game, with a goal on each side of a playing field, the object of the game being to put a ball into one of the goals via the bots 100, and prevent the other team from placing the ball into the other goal. A bot 100 on the second team is illustrated as being in possession of the ball.

The bots 100 on both teams may act autonomously (i.e., without direct user control) based on a machine learning model and the rules of the scenario that the bot 100 has been placed in. For example, each of the bots 100 may determine positions on the playing field to move to, whether to attempt to score a goal, whether to block the movement of another bot 100, etc., based on the machine learning model maintained by the individual bot 100. In various embodiments, the machine learning model is a Markov decision tree with likelihoods of performing a given action out of a set of possible actions, although other probabilistic models or reinforcement learning models are possible. In some embodiments, the behavioral commands may influence the weights/probabilities assigned to performing certain actions maintained in the machine learning model for each bot 100. In other embodiments, the behavioral commands activate different machine learning modules for each bot 100. For example, a defensive model, an offensive model, a general model, etc. may be maintained to provide separate probabilities for performing various actions that may each be provided feedback for separately.

FIG. 8B illustrates the first user issuing an utterance of "defend!," which the bots 100 on the first team interpret to indicate a defensive behavior command, to assume defensive positions, and to prioritize actions to prevent the bots 100 on the second team from scoring. Each bot 100 may continue to act autonomously (within the rules of the scenario), but how that bot 100 chooses to act is influenced by the behavior command. For example, the bots 100 acting with a defend behavioral priority may move closer to a goal to defend, may move closer to bots 100 of the other team that have crossed the center line of the playing field, etc. compared to bots enacting a general behavior pattern.

Figure 8C:
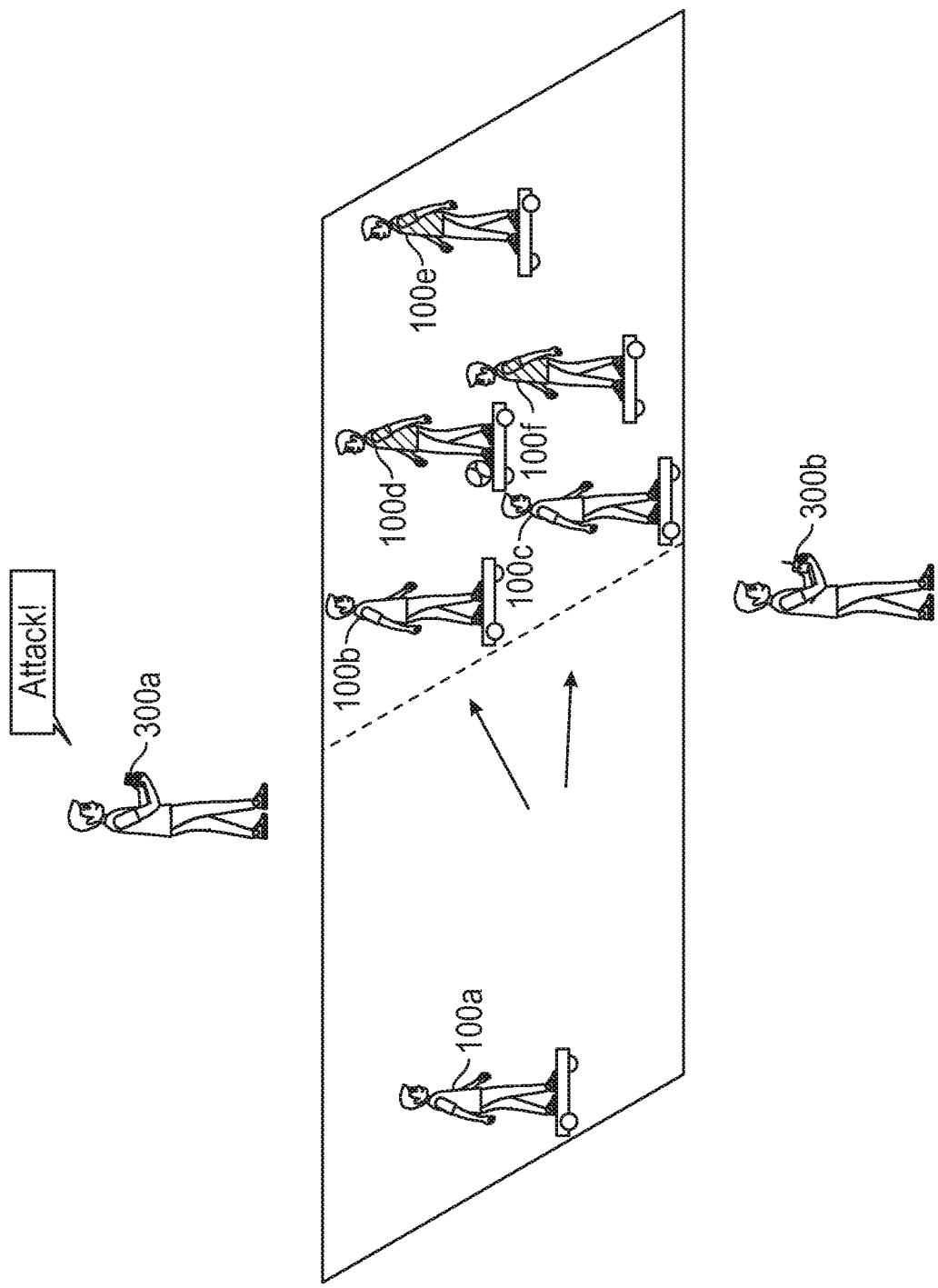

FIG. 8C illustrates the first user issuing an utterance of "attack!," which the bots 100 on the first team interpret as a behavior command to assume offensive positions, and to prioritize actions to score a goal on the bots 100 of the second team. Each bot 100 may continue to act autonomously (within the rules of the scenario), but how that bot 100 chooses to act is influenced by the behavior command. For example, the bots acting with an attack behavioral priority may move closer to a goal to score on, may move further away from bots 100 on the other team, may move closer to the ball, etc. compared to bots enacting a general behavioral pattern.

Figure 8D:
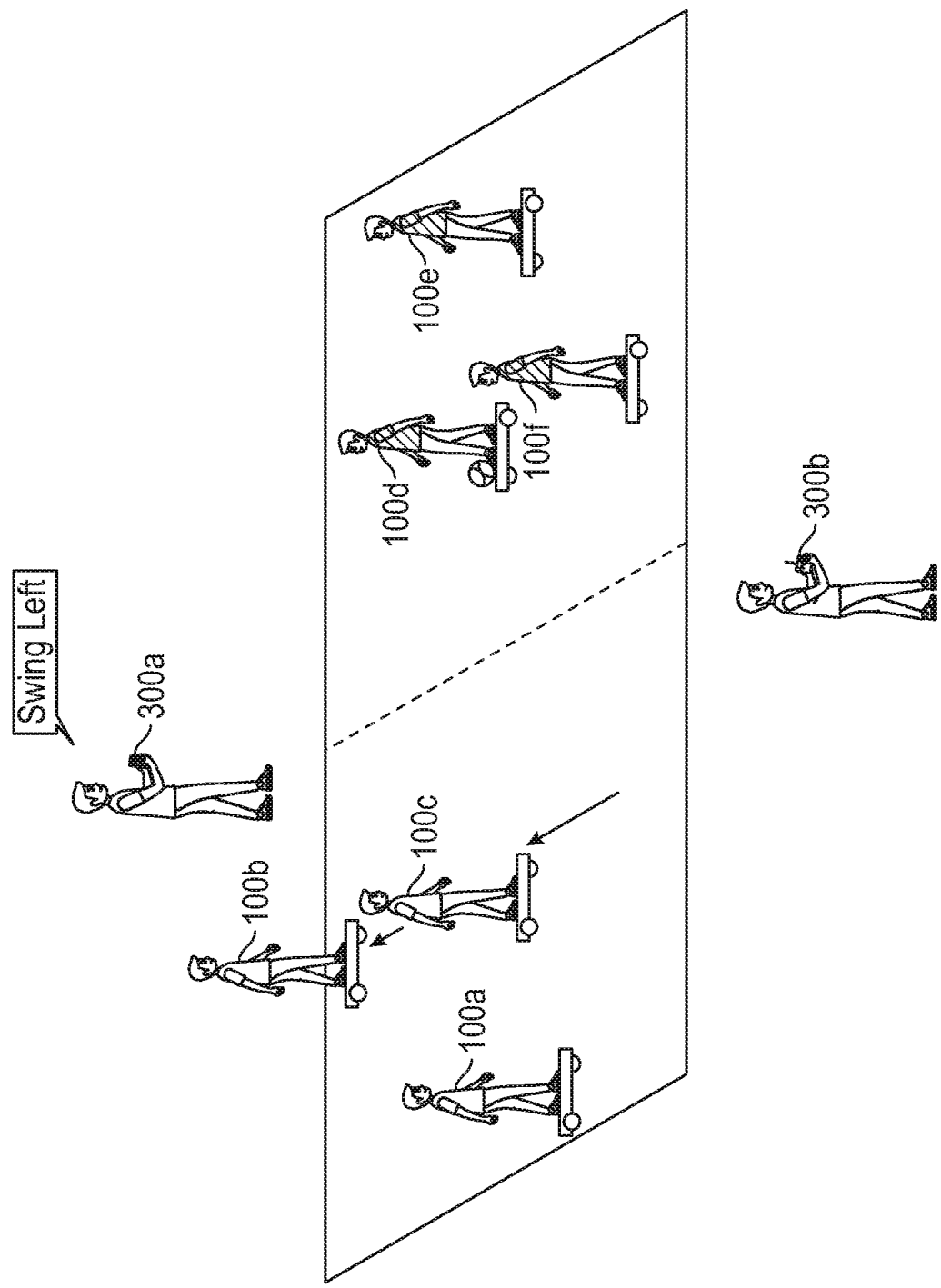

FIG. 8D illustrates the first user issuing real-time feedback to the first team via the utterance of "swing left". The bots 100 on the first team interpret the utterance as a behavior command, and adjust the weights of the associated machine learning models to move leftward on the playing field. In various embodiments, the leftward drift imparted by the example behavior command may be temporary; the added weight for leftward positioning may gradually decay, returning the bots 100 to an original positioning preference over a predetermined time period. In other embodiments, the leftward drift remains in place until countermanded (e.g., by a "swing right" or "center up" command). As illustrated, each bot 100 may interpret the effect differently; a first bot 100a in goal and a second bot 100b on the left wing making small adjustments in position, and a third bot 100c on the right wing making larger adjustments in position.

Figure 8E:
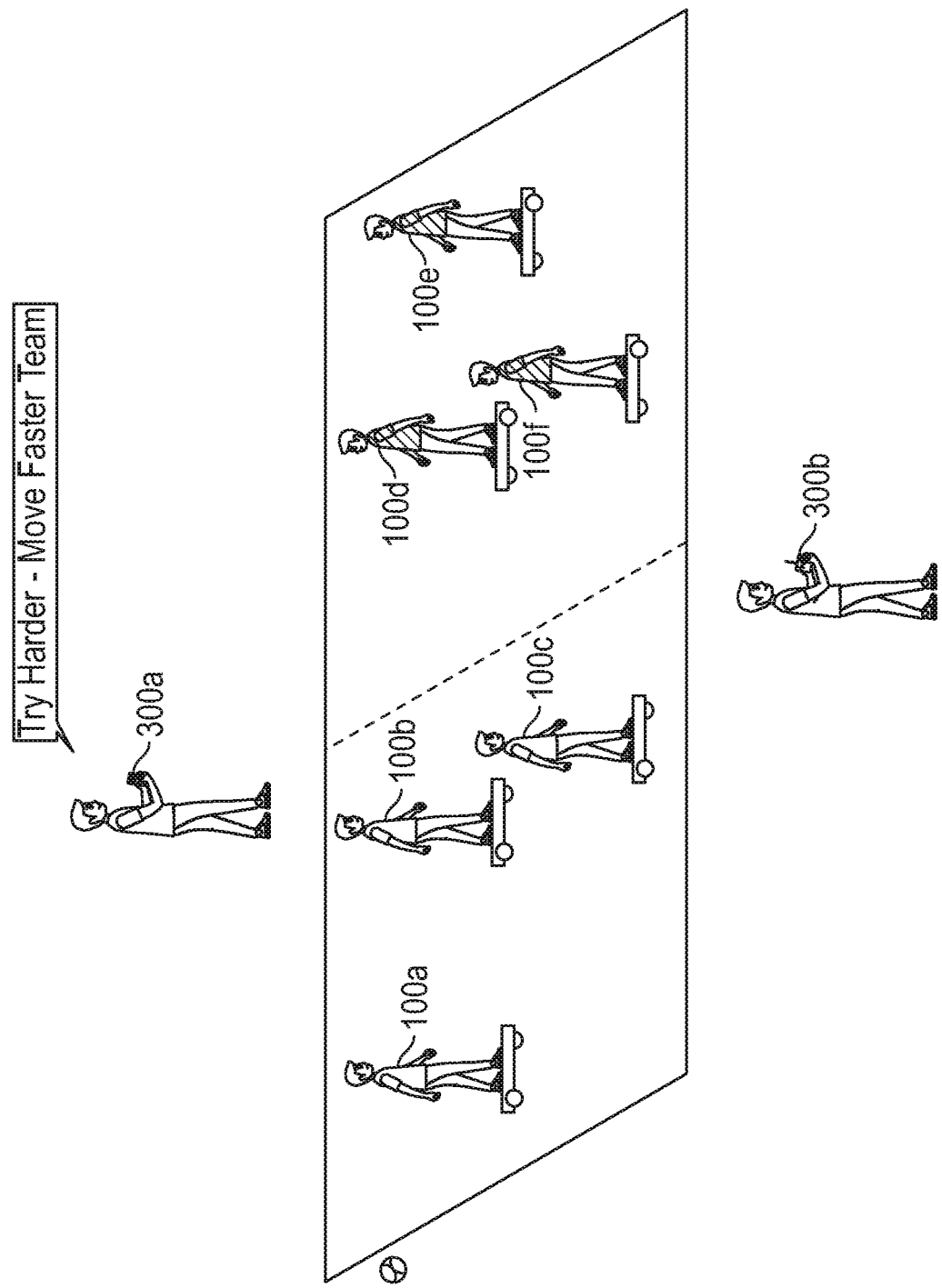

FIG. 8E illustrates the first user issuing after-action feedback, such as, for example, after play is paused after a goal, at a pause, or at conclusion of the game. The feedback may include group feedback, affecting the machine learning models of two or more of the bots 100 on a given team, and the feedback may include individualized feedback, affecting a particular subset or individual bot 100 on the team. For example, after scoring a goal, bots 100 on offense may receive positive reinforcement for the recently taken actions, while bots 100 on defense may receive no reinforcement (or a smaller positive reinforcement) for the recently taken actions. In contrast, after blocking a goal, bots 100 on defense may receive positive reinforcement for the recently taken actions, while bots 100 on offense may receive no reinforcement (or a smaller positive reinforcement) for the recently taken actions. Reinforcement may be received due the scenario itself, or come from the user providing utterances such as "good job team", "try harder team", "good job goalie", "go faster wing", etc., which the bots 100 interpret as feedback.

Figure 9:
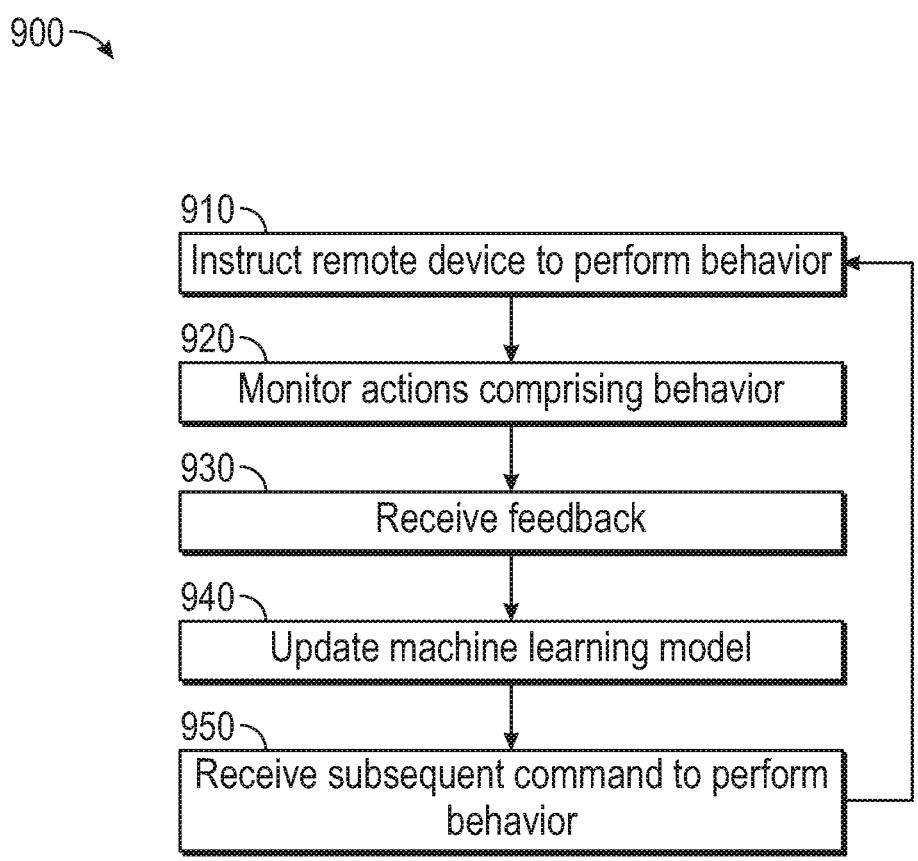
FIG. 9 is a flowchart of a method for autonomous drone play and alignment, according to aspects of the present disclosure.

FIG. 9 is a flowchart of a method 900 for autonomous drone play and alignment. Method 900 begins at block 910, where a command system instructs a remotely controlled device (e.g., a bot 100 or group of bots 100) to perform a behavior command. The command system represents the computing device used to autonomously control a remotely controlled device via a Machine Learning model, and in various embodiments may be the bot 100 (e.g., the remotely controlled device), an RC 300 paired with the bot 100, or a third device used to stochastically determine actions for one or more bots 100 to perform (e.g., a central server). In some embodiments, command system receives an instruction for the bot 100 to perform the behavior command is part of a teaching sequence that specifies a series of user-defined actions to teach as the behavior command to the machine learning model. In other embodiments, command system receives an instruction to perform a behavior command that identifies an already-learned behavior for the bot 100 to perform, and the command system stochastically selects, according to the machine learning model using the taught-behavior and environmental sensor data, which individual actions from a pool of candidate actions that the bot 100 is to perform as part of the behavior command.

At block 920, the command system monitors the actions performed by the bot 100 as part of the behavior. The command system monitors what actions were performed by the bot 100, an intensity of those actions (e.g., a speed, duration, extent), environmental conditions when the action was performed (including positions of other bots 100 in the environment), what alternative actions to the selected action were not performed, whether the action is user-specified or autonomously-specified by the machine learning model, etc. In some embodiments, in which multiple bots 100 are instructed to perform the same behavior, the command system monitors the actions of each of the bots 100 performing the behavior. For example, a first bot 100a may perform a first series of actions to perform the behavior, while a second bot 100b may perform a second, different series of actions to perform the behavior, which the command system monitors both of.

At block 930, the command system receives feedback related to how well or poorly the bot 100 performed the behavior. In some embodiments, the feedback indicates that the selected or received actions that were part of the behavior met with (or exceeded) or failed to meet the expectations of a user (e.g., a user providing utterances such as "good job team", "try harder team", "good job goalie", "go faster wing", etc.). In some embodiments, the feedback is received from a second device (e.g., a device may project an IR beam corresponding to a "zapper ray") or from environmental sensors to indicate whether the behavior met with or failed to meet with expectations of a user or a scenario (e.g., the behavior led the bot 100 to move "out of bounds," "score a goal," "evade an opponent," etc.).

In some embodiments, in which multiple bots 100 are instructed to perform the same behavior, the command system monitors the feedback to each of the bots 100 performing the behavior. In some embodiments, the feedback is directed to a specific individual bot 100 (e.g., "good job Goalie"), but may also be directed to multiple indicated bots 100 (e.g., "good job team," "Try harder forwards"). When the feedback is directed to multiple bots 100, the command system updates the machine learning models of each of the bots 100, so that multiple machine learning models are appropriately updated.

In some embodiments, the feedback is received as a voice command, and the command system identifies whether the speaker of the voice command is a designated user of the bot 100. For example, two users may be interacting with bots 100 in a shared environment (e.g., controlling competing bots 100) and the command system will differentiate utterances from the first user and utterances from the second user based on vocal patterns, volume, key phrases, etc., so that the feedback from a non-designated user is not applied to the bot 100 of a designated user. Accordingly, once the command system identifies the feedback as being received from a speaker associated with the bot 100, the feedback is accepted. In contrast, once the command system identifies the feedback as being received from a speaker other than a user associated with the bot 100, the feedback is rejected or ignored. In this way, a user may provide spoken feedback that is received by a command system for a first bot 100a and a command system for a second bot 100b, but only applied to the machine learning model of the appropriate bot 100.

At block 940, the command system uses the feedback to update the machine learning model used by the bot 100 (or bots 100) to produce a second, different series of actions to perform the behavior when the behavior is next invoked for the bot 100 to perform. In some embodiments, the feedback may refine the behavior in the machine learning model by adding an additional action to a series of actions defining the behavior, removing an indicated action from the series of actions defining the behavior, altering an intensity of a specified action within the series of actions defining the behavior, or adjusting the weights assigned to candidate actions within the pool of candidate actions that determine the probabilities of whether the machine learning model selects one individual candidate action over another candidate action from the pool of candidate actions.

At block 950, the command system receives a subsequent command for the bot 100 to perform the behavior. The machine learning model, however, has updated how the behavior is to be performed from the prior performance. For example, after receiving feedback, the machine learning model may be updated such that the previously performed actions are more likely or less likely to be performed the next time the bot 100 is instructed to perform the behavior. In another example, after learning the behavior from user-defined commands (e.g., joystick and button presses indicating the actions that define a complex behavior), the machine learning model autonomously (e.g., stochastically, without further user input) selects the individual actions for the bot 100 to perform in series to thereby perform the behavior. Method 900 may then return to block 910 for the command system to instruct the bot 100 to perform the updated (different) series of actions that defined the behavior.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
in response to receiving a command for a remotely controlled device to perform a behavior, identifying a first series of actions that are grouped in a sequence to define the behavior, wherein each action of the first series of actions is a user-directed action for the remotely controlled device to perform in the sequence taught by a user to a machine learning model;
monitoring a performance of the first series of actions when executed by the remotely controlled device, wherein the remotely controlled device performs each action of the first series of actions at a base speed for the actions of the first series of actions and for a base duration for the actions of the first series of actions;
receiving feedback related to how the remotely controlled device performs the behavior, wherein the feedback is received from at least one of the user, a second device, or environmental sensors;
updating, according to the feedback, the machine learning model used by the remotely controlled device to produce a second series of actions to perform the behavior that is different from the first series of actions; and
in response to receiving a subsequent command to perform the behavior, instructing the remotely controlled device to perform the second series of actions.

2. The method of claim 1, wherein the feedback refines behavior in the machine learning model by one of:
adding an additional action to the first series of actions; and
removing an indicated action from the first series of actions.

3. The method of claim 1, wherein instructing the remotely controlled device to perform the second series of actions further comprises:
identifying the behavior to the remotely controlled device; and
selecting, stochastically according to the machine learning model, individual actions to comprise the second series of actions from a pool of candidate actions.

4. The method of claim 3, further comprising:
monitoring a third series of actions performed by a second remotely controlled device that comprises the behavior;
updating, according to the feedback, a second machine learning model used by the second remotely controlled device to produce a fourth series of actions to comprise the behavior, wherein the fourth series of actions is different than the second series of actions; and
in response to receiving the subsequent command to perform the behavior, instructing the second remotely controlled device to perform the fourth series of actions.

5. The method of claim 1, wherein the feedback is received as a voice command, further comprising:
identifying a speaker of the voice command; and
in response to determining that the speaker is associated with the remotely controlled device, accepting the voice command as the feedback.

6. The method of claim 1, further comprising:
receiving, during performance of the first series of actions after a first action in the first series of actions and before performing a second action in the first series of actions, an interrupting command from the user; and
performing an action associated with the interrupting command.

7. The method of claim 1, wherein the remotely controlled device performs at least one action of the second series of actions at a different speed or for a different duration than the equal speed and equal duration based on the feedback.

8. The method of claim 1, further comprising:
identifying a designated group of entities to accept the feedback from, wherein the designated group of entities includes the user; and
in response to receiving a second feedback from a second user not identified as part of the designated group of entities to accept the feedback from, ignoring the second feedback, wherein the feedback from the user is differentiated from the second feedback from the second user via natural language processing and voice recognition trained to identity voiced utterances associated with the user.

9. The method of claim 1, wherein the command for the remotely controlled device to perform the behavior is a voice command, wherein the first series of actions are received as manual commands for the remotely controlled device, wherein the user associates the voice command with the first series of actions.

10. A system, comprising:
a processor; and
a memory, including instructions that when performed by the processor enable the system to:
in response to receiving a command for a remotely controlled device to perform a behavior, identify a first series of actions that are grouped in a sequence to define the behavior, wherein each action of the first series of actions is a user-directed action for the remotely controlled device to perform in the sequence taught by a user to a machine learning model;
monitor a performance of the first series of actions when executed by the remotely controlled device, wherein the remotely controlled device performs each action of the first series of action at a base speed for base duration;
receive feedback related to how the remotely controlled device performs the behavior, wherein the feedback is received from at least one of the user, a second device, or environmental sensors;
update, according to the feedback, the machine learning model used by the remotely controlled device to produce a second series of actions to perform the behavior that is different from the first series of actions; and
in response to receiving a subsequent command to perform the behavior, instruct the remotely controlled device to perform the second series of actions.

11. The system of claim 10, wherein to refine the behavior in the machine learning model, the feedback instructs the system to:
add an additional action to the first series of actions; and
remove an indicated action from the first series of actions.

12. The system of claim 10, wherein to instruct the remotely controlled device to perform the second series of actions, the system is further enabled to:
  identify the behavior to the remotely controlled device; and
  select, stochastically according to the machine learning model, individual actions to comprise the second series of actions from a pool of candidate actions.

13. The system of claim 12, wherein the system is further enabled to:
  monitor a third series of actions performed by a second remotely controlled device that comprise the behavior;
  update, according to the feedback, a second machine learning model used by the second remotely controlled device to produce a fourth series of actions to comprise the behavior, wherein the fourth series of actions is different than the second series of actions; and
  in response to receiving the subsequent command to perform the behavior, instruct the second remotely controlled device to perform the fourth series of actions.

14. The system of claim 10, wherein the feedback is received as a voice command, and the system is further enabled to:
  identify a speaker of the voice command; and
  in response to determining that the speaker is associated with the remotely controlled device, accept the voice command as the feedback.

15. A non-transitory computer-readable medium containing computer program code that, when executed by operation of one or more computer processors, performs an operation comprising:
  in response to receiving a command for a remotely controlled device to perform a behavior, identifying a first series of actions that are grouped in a sequence to define the behavior, wherein each action of the first series of actions is a user-directed action for the remotely controlled device to perform in the sequence taught by a user to a machine learning model;
  monitoring a performance of the first series of actions when executed by the remotely controlled device, wherein the remotely controlled device performs each action of the first series of actions at a base speed for the first series of actions and for a base duration for the first series of actions;
  receiving feedback related to how the remotely controlled device performs the behavior, wherein the feedback is received from at least one of the user, a second device, or environmental sensors;
  updating, according to the feedback, the machine learning model used by the remotely controlled device to produce a second series of actions to perform the behavior that is different from the first series of actions; and
  in response to receiving a subsequent command to perform the behavior, instructing the remotely controlled device to perform the second series of actions.

16. The non-transitory computer-readable medium of claim 15, wherein the feedback refines behavior in the machine learning model by one of:
  adding an additional action to the first series of actions; and
  removing an indicated action from the first series of actions.

17. The non-transitory computer-readable medium of claim 15, wherein instructing the remotely controlled device to perform the second series of actions further comprises:
  identifying the behavior to the remotely controlled device; and
  selecting, stochastically according to the machine learning model, individual actions to comprise the second series of actions from a pool of candidate actions.

18. The non-transitory computer-readable medium of claim 17, wherein updating the machine learning model comprises altering weights assigned to candidate actions within the pool of candidate actions, wherein the weights determine a probability that the machine learning model selects an individual candidate action over other candidate actions from the pool of candidate actions.

19. The non-transitory computer-readable medium of claim 17, further comprising:
  monitoring a third series of actions performed by a second remotely controlled device that comprise the behavior;
  updating, according to the feedback, a second machine learning model used by the second remotely controlled device to produce a fourth series of actions to comprise the behavior, wherein the fourth series of actions is different than the second series of actions; and
  in response to receiving the subsequent command to perform the behavior, instructing the second remotely controlled device to perform the fourth series of actions.

* * * * *

UNITED STATES PATENT AND TRADEMARK OFFICE
CERTIFICATE OF CORRECTION

PATENT NO. : 11,385,635 B2
APPLICATION NO. : 16/406654
DATED : July 12, 2022
INVENTOR(S) : Nathan D. Nocon et al.

Page 1 of 1

It is certified that error appears in the above-identified patent and that said Letters Patent is hereby corrected as shown below:

In the Claims

In Column 22, Line 49, in Claim 10, delete "base" and insert -- a base --.

Signed and Sealed this
Twenty-fifth Day of October, 2022

Katherine Kelly Vidal
*Director of the United States Patent and Trademark Office*